(12) United States Patent
Suvitie

(10) Patent No.: US 10,802,685 B2
(45) Date of Patent: Oct. 13, 2020

(54) VEHICLE MARKING IN VEHICLE MANAGEMENT SYSTEMS

(71) Applicant: Nokia Technologies Oy, Espoo (FI)

(72) Inventor: Arto Kristian Suvitie, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 191 days.

(21) Appl. No.: 15/879,686

(22) Filed: Jan. 25, 2018

(65) Prior Publication Data

US 2019/0227683 A1 Jul. 25, 2019

(51) Int. Cl.
*G06F 3/0484* (2013.01)
*B64C 39/02* (2006.01)

(52) U.S. Cl.
CPC .......... *G06F 3/0484* (2013.01); *B64C 39/024* (2013.01); *B64C 2201/127* (2013.01); *B64C 2201/146* (2013.01)

(58) Field of Classification Search
CPC ............. G06F 3/0484; B64C 2201/146; B64C 2201/127; B64C 39/024
See application file for complete search history.

(56) References Cited

U.S. PATENT DOCUMENTS

| | | | | |
|---|---|---|---|---|
| 5,179,377 A | * | 1/1993 | Hancock | .................... G01S 7/20 340/961 |
| 7,408,552 B2 | | 8/2008 | Kellman et al. | |
| 8,532,844 B2 | | 9/2013 | Wilson et al. | |
| 8,633,835 B1 | * | 1/2014 | Spencer, V | ............ G01C 23/00 340/977 |
| 2003/0151630 A1 | * | 8/2003 | Kellman | .................... G01S 7/06 715/838 |
| 2010/0082184 A1 | * | 4/2010 | Nichols | ................. G06T 11/206 701/3 |

(Continued)

FOREIGN PATENT DOCUMENTS

CN 105045277 A 11/2015

OTHER PUBLICATIONS

Wong, B.L., et al., "3D-in-2D Displays for ATC," 6th EUROCONTROL Innovative Research Workshop and Exhibition: Disseminating ATM Innovative Research, 2007, 17 pages.

*Primary Examiner* — Tuyetlien T Tran
(74) *Attorney, Agent, or Firm* — Tong, Rea, Bentley & Kim, LLC

(57) ABSTRACT

The present disclosure generally discloses a vehicle marking capability configured to support marking of vehicles in a vehicle management system. The vehicle marking capability is configured to support marking of vehicles in a graphical user interface (GUI) that is supported by a vehicle management application that is supported by the vehicle management system. The vehicle marking capability may be configured to support marking of various vehicle measures of vehicles for various vehicle types which may be managed by the vehicle management system. The vehicle marking capability may be configured to support marking of vehicle measures for vehicles using measure objects having lengths that are based on the vehicle measures (e.g., using linear scaling, logarithmic scaling, or the like). The vehicle marking capability may be configured to support marking of vehicle altitudes for aerial vehicles using altitude columns having column heights that are based on the vehicle altitudes.

18 Claims, 10 Drawing Sheets

(56) References Cited

U.S. PATENT DOCUMENTS

| | | | |
|---|---|---|---|
| 2011/0041088 A1* | 2/2011 | Mason | G06F 3/04817 |
| | | | 715/767 |
| 2012/0001918 A1* | 1/2012 | Sankaraswami | G06T 11/206 |
| | | | 345/440 |
| 2015/0142211 A1 | 5/2015 | Shehata et al. | |
| 2016/0171650 A1* | 6/2016 | Wilson, Jr. | G08G 5/0021 |
| | | | 701/431 |
| 2017/0213465 A1 | 7/2017 | Parekh et al. | |

* cited by examiner

VEHICLE MARKING IN VEHICLE MANAGEMENT SYSTEMS

TECHNICAL FIELD

The present disclosure relates generally to vehicle management and, more particularly but not exclusively, to vehicle marking in vehicle management systems.

BACKGROUND

Vehicle management systems may be used for performing various types of vehicle management functions (e.g., vehicle tracking, vehicle control, or the like) to manage various types of vehicles (e.g., land-based vehicles, manned aerial vehicles, unmanned aerial vehicles, or the like). Many vehicle management systems may utilize graphical user interfaces (GUIs) to enable users of the vehicle management systems to visualize management of vehicles. Many vehicle management systems utilizing GUIs to enable users of the vehicle management systems to visualize management of vehicles may represent vehicles and characteristics of vehicles to users of the vehicle management systems in various ways; however, representation of certain types of vehicles, or certain characteristics of certain types of vehicles, may be difficult in many types of vehicle management systems.

SUMMARY

The present disclosure generally discloses vehicle marking capabilities configured for use in marking vehicles in graphical user interfaces (GUIs) supported by vehicle management systems.

In at least some embodiments, an apparatus is provided. The apparatus is configured to support marking of vehicles in a vehicle management application supported by a vehicle management system. The apparatus includes a processor and a memory communicatively connected to the processor. The processor is configured to initiate presentation of a GUI at a device according to a vehicle management application. The GUI includes one or more vehicle objects representing one or more respective vehicles. The GUI includes one or more measure objects representing respective measures of the one or more vehicles, wherein respective lengths of the one or more measure objects have a logarithmic scaling in which the respective lengths of the one or more measure objects are logarithmically related to the respective measures of the one or more vehicles. In at least some embodiments, the respective measures of the one or more vehicles include altitudes of the one or more vehicles, distances associated with the one or more vehicles, gaps associated with the one or more vehicles, speeds of the one or more vehicles, velocities of the one or more vehicles, or accelerations of the one or more vehicles. In at least some embodiments, within the GUI, the one or more measure objects are associated with the one or more vehicle objects. In at least some embodiments, within the GUI, the one or more measure objects are separate from the one or more vehicle objects. In at least some embodiments, the one or more vehicle objects are provided in a first region of the GUI and the one or more measure objects are provided in a second region of the GUI, wherein the first region of the GUI and the second region of the GUI are non-overlapping. In at least some embodiments, the GUI includes one or more measure values associated with the respective one or more vehicles, wherein, within the GUI, the one or more measure values are associated with the one or more measure objects. In at least some embodiments, the GUI includes a map, in perspective view, of a region within which the vehicles are operating. In at least some embodiments, the one or more vehicle objects and the one or more measure objects at least partially overlap the map. In at least some embodiments, the map is provided in a first region of the GUI, wherein the one or more vehicle objects and the one or more measure objects are provided in a second region of the GUI, wherein the first region of the GUI and the second region of the GUI are non-overlapping. In at least some embodiments, the processor is configured to determine whether to use the logarithmic scaling for the lengths of the one or more measure objects or a linear scaling for the lengths of the one or more measure objects. In at least some embodiments, the processor is configured to determine whether to use the logarithmic scaling for the lengths of the one or more measure objects or the linear scaling for the lengths of the one or more measure objects based on at least one of an indication as to whether the one or more vehicles are currently flying, an indication of expected measures of the one or more vehicles, or one or more GUI display settings. In at least some embodiments, the processor is configured to initiate switching from use of the logarithmic scaling for the lengths of the one or more measure objects to use of a linear scaling for the lengths of the one or more measure objects. In at least some embodiments, the processor is configured to initiate switching from use of the logarithmic scaling for the lengths of the one or more measure objects to use of the linear scaling for the lengths of the one or more measure objects based on at least one of an indication that the measures of the one or more vehicles satisfy a threshold, an indication that a range of the measures of the one or more vehicles satisfy a threshold, or one or more GUI display settings. In at least some embodiments, the processor is configured to determine a level of detail to provide in the GUI for the one or more vehicles. In at least some embodiments, the processor is configured to determine the level of detail to provide in the GUI for the one or more vehicles based on at least one of a quantity of vehicles represented in the GUI, respective locations of the one or more vehicles, or an indication as to whether there is overlap of information presented in the GUI for the one or more vehicles. In at least some embodiments, the processor is configured to initiate switching from use of a first level of detail in the GUI for the one or more vehicles to use of a second level of detail in the GUI for the one or more vehicles based on at least one of a detection of overlap of information presented in the GUI for the one or more vehicles or a detection of a request for a different level of detail in the GUI. In at least some embodiments, apparatus is or forms part of the device, wherein, to initiate presentation of the GUI on the device, the processor is configured to provide imagery including the GUI to a display interface of the device. In at least some embodiments, the apparatus is or forms part of a vehicle management controller, wherein, to initiate presentation of the GUI on the device, the processor is configured to send imagery including the GUI toward the device via a communication network. In at least some embodiments, a non-transitory computer-readable storage medium stores instructions which, when executed by a computer, cause the computer to perform a corresponding method for supporting marking of vehicles in a vehicle management application supported by a vehicle management system. In at least some embodiments, a corresponding method for supporting marking of vehicles in a vehicle management application supported by a vehicle management system is provided.

In at least some embodiments, an apparatus is provided. The apparatus is configured to support marking of vehicles in a vehicle management application supported by a vehicle management system. The apparatus includes a processor and a memory communicatively connected to the processor. The processor is configured to initiate presentation of a GUI at a device according to a vehicle management application. The GUI includes one or more vehicle objects representing one or more respective vehicles. The GUI includes one or more measure objects representing respective measures of the one or more vehicles, wherein respective lengths of the one or more measure objects have a linear scaling in which the respective lengths of the one or more measure objects are linearly related to the respective measures of the one or more vehicles or a logarithmic scaling in which the respective lengths of the one or more measure objects are logarithmically related to the respective measures of the one or more vehicles. The processor is configured to initiate switching between use of the linear scaling for the respective lengths of the one or more measure objects and use of the logarithmic scaling for the respective lengths of the one or more measure objects. In at least some embodiments, the respective measures of the one or more vehicles include altitudes of the one or more vehicles, distances associated with the one or more vehicles, gaps associated with the one or more vehicles, speeds of the one or more vehicles, velocities of the one or more vehicles, or accelerations of the one or more vehicles. In at least some embodiments, within the GUI, the one or more measure objects are associated with the one or more vehicle objects. In at least some embodiments, within the GUI, the one or more measure objects are separate from the one or more vehicle objects. In at least some embodiments, the one or more vehicle objects are provided in a first region of the GUI and the one or more measure objects are provided in a second region of the GUI, wherein the first region of the GUI and the second region of the GUI are non-overlapping. In at least some embodiments, the GUI includes one or more measure values associated with the respective one or more vehicles, wherein, within the GUI, the one or more measure values are associated with the one or more measure objects. In at least some embodiments, the GUI includes a map, in perspective view, of a region within which the vehicles are operating. In at least some embodiments, the one or more vehicle objects and the one or more measure objects at least partially overlap the map. In at least some embodiments, the map is provided in a first region of the GUI, wherein the one or more vehicle objects and the one or more measure objects are provided in a second region of the GUI, wherein the first region of the GUI and the second region of the GUI are non-overlapping. In at least some embodiments, the processor is configured to determine whether to use the linear scaling for the lengths of the one or more measure objects or the logarithmic scaling for the lengths of the one or more measure objects. In at least some embodiments, the processor is configured to determine whether to use the linear scaling for the lengths of the one or more measure objects or the logarithmic scaling for the lengths of the one or more measure objects based on at least one of an indication as to whether the one or more vehicles are currently flying, an indication of expected measures of the one or more vehicles, or one or more GUI display settings. In at least some embodiments, the processor is configured to initiate switching between use of the linear scaling for the lengths of the one or more measure objects and use of the logarithmic scaling for the lengths of the one or more measure objects based on at least one of an indication that the measures of the one or more vehicles satisfy a threshold, an indication that a range of the measures of the one or more vehicles satisfy a threshold, or one or more GUI display settings. In at least some embodiments, the processor is configured to determine a level of detail to provide in the GUI for the one or more vehicles. In at least some embodiments, the processor is configured to determine the level of detail to provide in the GUI for the one or more vehicles based on at least one of a quantity of vehicles represented in the GUI, respective locations of the one or more vehicles, or an indication as to whether there is overlap of information presented in the GUI for the one or more vehicles. In at least some embodiments, the processor is configured to initiate switching from use of a first level of detail in the GUI for the one or more vehicles to use of a second level of detail in the GUI for the one or more vehicles based on at least one of a detection of overlap of information presented in the GUI for the one or more vehicles or a detection of a request for a different level of detail in the GUI. In at least some embodiments, apparatus is or forms part of the device, wherein, to initiate presentation of the GUI on the device, the processor is configured to provide imagery including the GUI to a display interface of the device. In at least some embodiments, the apparatus is or forms part of a vehicle management controller, wherein, to initiate presentation of the GUI on the device, the processor is configured to send imagery including the GUI toward the device via a communication network. In at least some embodiments, a non-transitory computer-readable storage medium stores instructions which, when executed by a computer, cause the computer to perform a corresponding method for supporting marking of vehicles in a vehicle management application supported by a vehicle management system. In at least some embodiments, a corresponding method for supporting marking of vehicles in a vehicle management application supported by a vehicle management system is provided.

In at least some embodiments, an apparatus is provided. The apparatus is configured to support marking of vehicles in a vehicle management application supported by a vehicle management system. The apparatus includes means for initiating presentation of a GUI at a device according to a vehicle management application. The GUI includes one or more vehicle objects representing one or more respective vehicles. The GUI includes one or more measure objects representing respective measures of the one or more vehicles, wherein respective lengths of the one or more measure objects have a logarithmic scaling in which the respective lengths of the one or more measure objects are logarithmically related to the respective measures of the one or more vehicles. In any of the foregoing embodiments of the apparatus, the respective measures of the one or more vehicles may include altitudes of the one or more vehicles, distances associated with the one or more vehicles, gaps associated with the one or more vehicles, speeds of the one or more vehicles, velocities of the one or more vehicles, or accelerations of the one or more vehicles. In any of the foregoing embodiments of the apparatus, within the GUI, the one or more measure objects may be associated with the one or more vehicle objects or the one or more measure objects may be separate from the one or more vehicle objects. In any of the foregoing embodiments of the apparatus in which the one or more measure objects are separate from the one or more vehicle objects, the one or more vehicle objects may be provided in a first region of the GUI and the one or more measure objects may be provided in a second region of the GUI, wherein the first region of the GUI and the second region of the GUI are non-overlapping. In any of the foregoing embodiments of the apparatus, the GUI may include one or more measure values associated with the respective one or more vehicles, wherein, within the GUI, the one or more measure values are associated with the one or more measure objects. In any of the foregoing embodiments of the apparatus, the GUI may include a map, in perspective view, of a region within which the vehicles are operating. In any of the foregoing embodiments of the apparatus, the one or more vehicle objects and the one or more measure objects may at least partially overlap the map or the map may be provided in a first region of the GUI and the one or more vehicle objects and the one or more measure objects may be provided in a second region of the GUI where the first region of the GUI and the second region of the GUI are non-overlapping. In any of the foregoing embodiments of the apparatus, the apparatus may further include means for determining whether to use the logarithmic scaling for the lengths of the one or more measure objects or the linear scaling for the lengths of the one or more measure objects, wherein determining whether to use the logarithmic scaling for the lengths of the one or more measure objects or the linear scaling for the lengths of the one or more measure objects may be based on at least one of an indication as to whether the one or more vehicles are currently flying, an indication of expected measures of the one or more vehicles, or one or more GUI display settings. In any of the foregoing embodiments of the apparatus, the apparatus may further include means for initiating switching from use of the logarithmic scaling for the lengths of the one or more measure objects to use of a linear scaling for the lengths of the one or more measure objects. In any of the foregoing embodiments of the apparatus, initiating switching between use of the linear scaling for the respective lengths of the one or more measure objects and use of the logarithmic scaling for the respective lengths of the one or more measure objects may be based on at least one of an indication that the measures of the one or more vehicles satisfy a threshold, an indication that a range of the measures of the one or more vehicles satisfy a threshold, or one or more GUI display settings. In any of the foregoing embodiments of the apparatus, the apparatus may further include means for determining a level of detail to provide in the GUI for the one or more vehicles, wherein determining the level of detail to provide in the GUI for the one or more vehicles may be based on at least one of a quantity of vehicles represented in the GUI, respective locations of the one or more vehicles, or an indication as to whether there is overlap of information presented in the GUI for the one or more vehicles. In any of the foregoing embodiments of the apparatus, the apparatus may further include means for initiating switching from use of a first level of detail in the GUI for the one or more vehicles to use of a second level of detail in the GUI for the one or more vehicles, wherein initiating switching may be based on at least one of a detection of overlap of information presented in the GUI for the one or more vehicles or a detection of a request for a different level of detail in the GUI. In any of the foregoing embodiments of the apparatus, apparatus is or forms part of the device and the means for initiating presentation of the GUI on the device include means for providing the imagery including the GUI to a display interface of the device or the apparatus is or forms part of a vehicle management controller and the means for initiating presentation of the GUI on the device includes means for sending imagery including the GUI toward the device via a communication network. In at least some embodiments, a non-transitory computer-readable storage medium stores instructions which, when executed by a computer, cause the computer to perform a corresponding method for supporting marking of vehicles in a vehicle management application supported by a vehicle management system. In at least some embodiments, a corresponding method for supporting marking of vehicles in a vehicle management application supported by a vehicle management system is provided.

In at least some embodiments, an apparatus is provided. The apparatus is configured to support marking of vehicles in a vehicle management application supported by a vehicle management system. The apparatus includes means for initiating presentation of a GUI at a device according to a vehicle management application. The GUI includes one or more vehicle objects representing one or more respective vehicles. The GUI includes one or more measure objects representing respective measures of the one or more vehicles, wherein respective lengths of the one or more measure objects have a linear scaling in which the respective lengths of the one or more measure objects are linearly related to the respective measures of the one or more vehicles or a logarithmic scaling in which the respective lengths of the one or more measure objects are logarithmically related to the respective measures of the one or more vehicles. The apparatus includes means for initiating switching between use of the linear scaling for the respective lengths of the one or more measure objects and use of the logarithmic scaling for the respective lengths of the one or more measure objects. In any of the foregoing embodiments of the apparatus, the respective measures of the one or more vehicles may include altitudes of the one or more vehicles, distances associated with the one or more vehicles, gaps associated with the one or more vehicles, speeds of the one or more vehicles, velocities of the one or more vehicles, or accelerations of the one or more vehicles. In any of the foregoing embodiments of the apparatus, within the GUI, the one or more measure objects may be associated with the one or more vehicle objects or the one or more measure objects may be separate from the one or more vehicle objects. In any of the foregoing embodiments of the apparatus in which the one or more measure objects are separate from the one or more vehicle objects, the one or more vehicle objects may be provided in a first region of the GUI and the one or more measure objects may be provided in a second region of the GUI, wherein the first region of the GUI and the second region of the GUI are non-overlapping. In any of the foregoing embodiments of the apparatus, the GUI may include one or more measure values associated with the respective one or more vehicles, wherein, within the GUI, the one or more measure values are associated with the one or more measure objects. In any of the foregoing embodiments of the apparatus, the GUI may include a map, in perspective view, of a region within which the vehicles are operating. In any of the foregoing embodiments of the apparatus, the one or more vehicle objects and the one or more measure objects may at least partially overlap the map or the map may be provided in a first region of the GUI and the one or more vehicle objects and the one or more measure objects may be provided in a second region of the GUI where the first region of the GUI and the second region of the GUI are non-overlapping. In any of the foregoing embodiments of the apparatus, the apparatus may further include means for determining whether to use the logarithmic scaling for the lengths of the one or more measure objects or the linear scaling for the lengths of the one or more measure objects, wherein determining whether to use the logarithmic scaling for the lengths of the one or more measure objects or the linear scaling for the lengths of the one or more measure objects may be based on at least one of an indication as to whether the one or more vehicles are currently flying, an indication of expected measures of the one or more vehicles, or one or more GUI display settings. In any of the foregoing embodiments of the apparatus, initiating switching between use of the linear scaling for the respective lengths of the one or more measure objects and use of the logarithmic scaling for the respective lengths of the one or more measure objects may be based on at least one of an indication that the measures of the one or more vehicles satisfy a threshold, an indication that a range of the measures of the one or more vehicles satisfy a threshold, or one or more GUI display settings. In any of the foregoing embodiments of the apparatus, the apparatus may further include means for determining a level of detail to provide in the GUI for the one or more vehicles, wherein determining the level of detail to provide in the GUI for the one or more vehicles may be based on at least one of a quantity of vehicles represented in the GUI, respective locations of the one or more vehicles, or an indication as to whether there is overlap of information presented in the GUI for the one or more vehicles. In any of the foregoing embodiments of the apparatus, the apparatus may further include means for initiating switching from use of a first level of detail in the GUI for the one or more vehicles to use of a second level of detail in the GUI for the one or more vehicles, wherein initiating switching may be based on at least one of a detection of overlap of information presented in the GUI for the one or more vehicles or a detection of a request for a different level of detail in the GUI. In any of the foregoing embodiments of the apparatus, apparatus is or forms part of the device and the means for initiating presentation of the GUI on the device include means for providing the imagery including the GUI to a display interface of the device or the apparatus is or forms part of a vehicle management controller and the means for initiating presentation of the GUI on the device includes means for sending imagery including the GUI toward the device via a communication network. In at least some embodiments, a non-transitory computer-readable storage medium stores instructions which, when executed by a computer, cause the computer to perform a corresponding method for supporting marking of vehicles in a vehicle management application supported by a vehicle management system. In at least some embodiments, a corresponding method for supporting marking of vehicles in a vehicle management application supported by a vehicle management system is provided.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
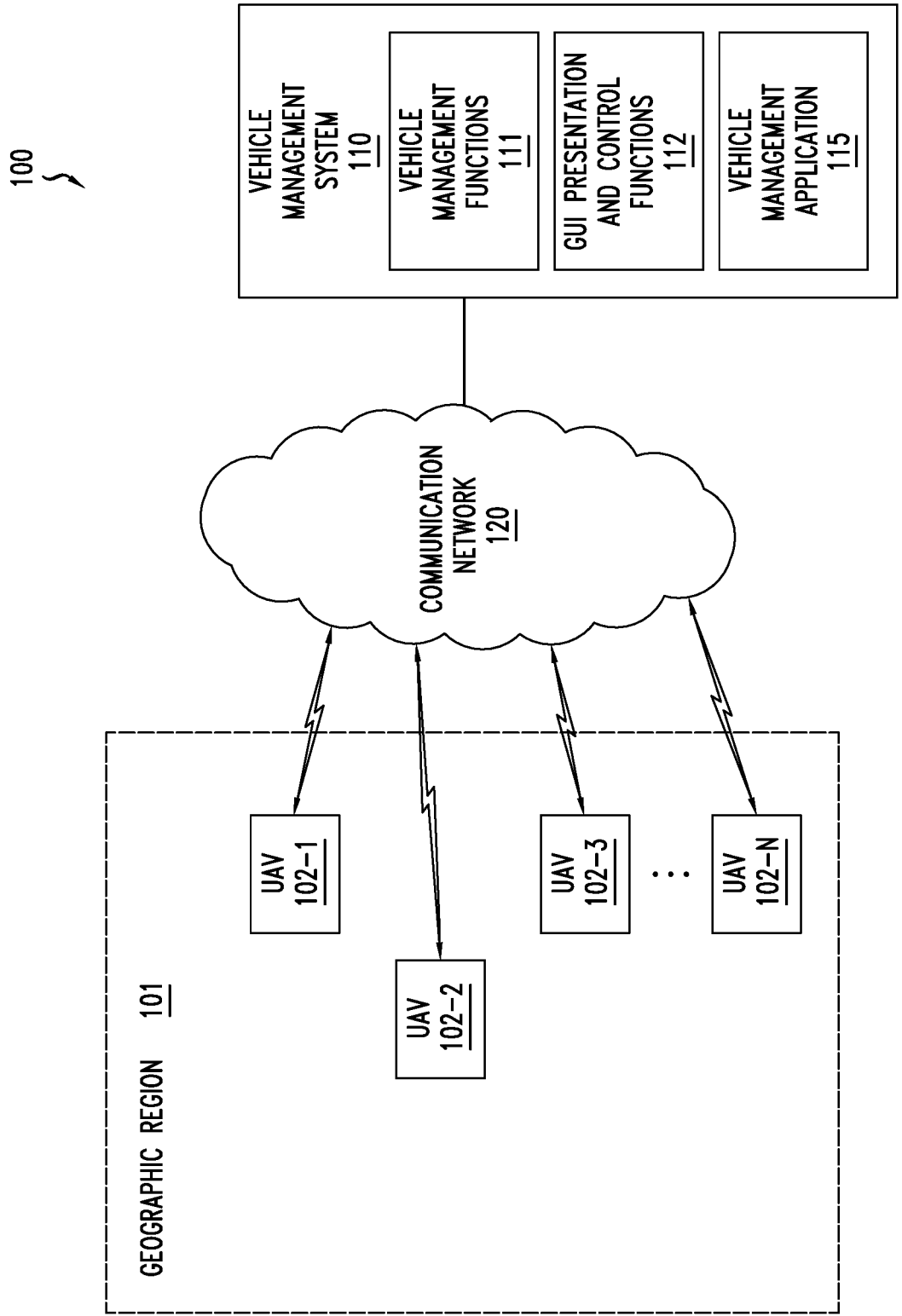
FIG. 1 depicts a vehicle management environment configured to support management of unmanned aerial vehicles (UAVs) by a vehicle management system.

The present disclosure generally discloses a vehicle marking capability configured to support marking of vehicles in a vehicle management system. The vehicle marking capability is configured to support marking of vehicles in a vehicle management application supported by the vehicle management system. The vehicle marking capability is configured to support marking of vehicles in a graphical user interface (GUI) that is supported by the vehicle management application. The marking of vehicles in the GUI supported by the vehicle management application may be supported in many ways based on the vehicle marking capability. The vehicle marking capability may be configured to support marking of various vehicle characteristics of vehicles (e.g., location information (e.g., latitude, longitude, or the like), measure information (e.g., altitude, distance, gap, speed, velocity, acceleration, or the like), status information (e.g., battery status, mission status, or the like), or the like) for various vehicle types which may be managed using a vehicle management system. The vehicle marking capability may be configured to support marking of vehicle altitude for aerial vehicles, such as unmanned aerial vehicles (UAVs), manned aerial vehicles, or the like. The vehicle marking capability may be configured to support marking of vehicle altitude for aerial vehicles using altitude columns having column heights that are based on vehicle altitudes of the aerial vehicles (e.g., using linear scaling in which the respective heights of the altitude columns are linearly related to the respective altitudes of vehicles, logarithmic scaling in which the respective heights of the altitude columns are logarithmically related to the respective altitudes of vehicles, or the like). The vehicle marking capability may be configured to support an initial determination of whether to use of altitude columns having column heights that are linearly related to vehicle altitude or whether to use altitude columns having column heights that are logarithmically related to vehicle altitude. The vehicle marking capability may be configured to integrate such altitude columns within GUI supported by the vehicle management application in various ways (e.g., with or without associating the altitude columns with graphical objects representing the aerial vehicles, with or without overlaying maps of geographic areas within which the aerial vehicles operate, in conjunction with or independent of display of maps of geographic areas within which the aerial vehicles operate, or the like, as well as various combinations thereof). The vehicle marking capability may be configured to support automatic switching between use of altitude columns having column heights that are linearly related to vehicle altitude and use of altitude columns having column heights that are logarithmically related to vehicle altitude. The vehicle marking capability may be configured to support various other functions related to visualization of vehicles in a vehicle management system (e.g., support for multiple levels of details, dynamic changes between levels of detail, or the like, as well as various combinations thereof). The presentation of the GUI associated with the vehicle management application may be initiated by a device, such as an end user device of the vehicle management system, a vehicle management controller of the vehicle management system (e.g., for display via one or more end user devices), or the like. It will be appreciated that, although primarily presented herein with respect to embodiments in which a specific type of vehicle measure (namely, vehicle altitude) is represented using a specific type of graphical object (namely, a column having a height associated therewith), information associated with vehicles may include various other types of vehicle measures (e.g., distance, gap, speed, velocity, acceleration, or the like), information associated with vehicles may be represented using various other types of graphical objects (e.g., rows, lines, or the like) having various characteristics associated therewith (e.g., length, width, or the like), or the like, as well as various combinations thereof. It will be appreciated that these and various other embodiments and advantages and potential advantages of the vehicle marking capability may be further understood by way of reference to the example vehicle management environment of FIG. 1.

FIG. 1 depicts a vehicle management environment configured to support management of unmanned aerial vehicles.

The vehicle management environment 100 includes a geographic region 101 within which a set of unmanned aerial vehicles (UAVs) 102-1-102-N (collectively, UAVs 102) are operating. The vehicle management environment 100 also includes a vehicle management system 110 configured to support vehicle management functions for supporting management of the UAVs 102. The vehicle management environment 100 includes a communication network 120 configured to support communications between the UAVs 102 and the vehicle management system 110. The vehicle management environment 100 may include various other elements configured for supporting the management of the UAVs 102 using vehicle management system 110. The geographic region 101 may include any geographic region within which UAVs 102 may operate. The geographic region 101 may be relatively small (e.g., for a single building or group of buildings, within a single city block, within a suburban neighborhood, or the like) or relatively large (e.g., covering all or part of a county, covering all or part of a continent, worldwide, or the like), as well as any suitable scope in between.

The UAVs 102 may include any unmanned aerial vehicles for which vehicle management functions may be performed. The UAVs 102 may be configured to move in three dimensions (namely, latitude, longitude, and altitude) with various speeds and types of maneuverability. The UAVs 102 may be configured to move based on preset flight patterns, based on active control by computers or end users (e.g., based on commands received by the UAVs 102 via the vehicle management system 110), or the like, as well as various combinations thereof. The UAVs 102 may include various devices configured to collect information to be provided to the vehicle management system 110, such as Global Positioning System (GPS) devices (e.g., GPS, Assisted-GPS, or the like) for determining locations of the UAVs 102, sensors (e.g., altimeters, barometers, or the like) for measuring altitudes of the UAVs 102, proximity sensors for measuring proximity of the UAVs 102, cameras for capturing images or videos from the perspective of the UAVs 102, or the like, as well as various combinations thereof. The UAVs 102 are communicatively connected to the vehicle management system 110 for enabling the vehicle management system 110 to support management of the UAVs 102 (e.g., receiving real-time status information from the UAVs 102 (e.g., latitude, longitude, altitude, trajectory, battery status, mission status, or the like, as well as various combinations thereof), sending flight control commands or other commands to the UAVs 102, or the like, as well as various combinations thereof). The UAVs 102 may be configured to support various types of wireless communication protocols for communicating with the vehicle management system 110, such as a cellular communication protocol (e.g., a Universal Mobile Telecommunications System (UMTS) protocol, a Long Term Evolution (LTE) protocol, or the like), a wireless local area network (WLAN) protocol (e.g., IEEE 802.X), a short-range radio frequency communication protocol (e.g., Bluetooth), an infrared data communication pathway (IRDA), or the like, as well as various combinations thereof. For example, the UAVs 102 may include winged drones, helicopter drones, quadcopter drones, or the like. It is noted that an example of a drone configured for use as a UAV 102 is presented in FIG. 2.

The vehicle management system 110 is configured to support various vehicle management functions for supporting management of the UAVs 102. The vehicle management system 110 may be configured to communicate with the UAVs 102 for purposes of obtaining status information associated with the UAVs 102 (e.g., flight tracking information, battery status information, mission status information, or the like), sending commands for controlling the UAVs 102 (e.g., for controlling the flight of the UAVs 102, for controlling mission related functions performed by the UAVs 102, or the like, as well as various combinations thereof), or the like, as well as various combinations thereof. The vehicle management system 110 may be configured to support management of the UAVs 102 by receiving management information related to the management of the UAVs 102, generating GUIs related to the management of the UAVs 102 based on the management information, and initiating presentation of the GUIs related to the management of the UAVs 102 (e.g., such that a user of the vehicle management system 110 may review status information associated with the UAVs 102, control the UAVs 102, or the like, as well as various combinations thereof). The vehicle management system 110 may be configured to support management of the UAVs 102 using vehicle management functions 111 (e.g., vehicle management information collection functions, vehicle management control functions, or the like) and GUI presentation and control functions 112. The vehicle management system 110 may support a vehicle management application 115 configured to support management of the UAVs 102. The vehicle management system 110 support various other functions and capabilities for supporting management of the UAVs 102.

The vehicle management system 110 may be implemented in various ways. For example, the vehicle management system 110 may be an end user device, a combination of a vehicle management controller and an end user device, or the like.

In at least some embodiments in which the vehicle management system 110 is an end user device, the vehicle management functions 111 and the GUI presentation and control functions 112 may be integrated within the end user device. In such embodiments, GUIs configured for managing the UAVs 102 may be generated by the vehicle management functions 111 and rendered via one or more display interfaces of the end user device by the GUI presentation and control functions 112. The end user device may be running the vehicle management application 115 configured to support management of the UAVs 102. For example, the end user device may be a smartphone, a tablet computer, a laptop computer, or the like.

In at least some embodiments in which the vehicle management system 110 is a combination of a vehicle management controller and an end user device, the vehicle management functions 111 may be provided by the vehicle management controller and the GUI presentation and control functions 112 may be provided by the end user device. In such embodiments, GUIs configured for managing the UAVs 102 may be generated by the vehicle management controller using the vehicle management functions 111 and provided to the end user device for rendering at the end user device via one or more display interfaces of the end user device by the GUI presentation and control functions 112. The GUIs configured for managing the UAVs 102 may be provided from the vehicle management controller to the end user device via any suitable communication channel (e.g., via one or more communication networks, such as communication network 120). The end user device may be running the vehicle management application 115 configured to support management of the UAVs 102 via interaction with the vehicle management controller. For example, the vehicle management controller may be a network server or other suitable device (e.g., a ground-based controller) and the end user device may be a smartphone, a tablet computer, a laptop computer, or other suitable device. It will be appreciated that, in at least some such embodiments, the vehicle management controller may be configured to support multiple end user devices.

In at least some such embodiments, as discussed above, the end user device may be configured to run the vehicle management application 115 which is associated with the vehicle management system 110 and which is configured to support various functions for supporting management of the UAVs 102. The vehicle management application 115 is configured to support various vehicle management functions for supporting management of the UAVs 102 (e.g., obtaining and presenting status information associated with the UAVs 102 (e.g., flight tracking information, battery status information, mission status information, or the like), controlling the flight of UAVs 102, or the like, as well as various combinations thereof). The vehicle management application 115 is configured to support various vehicle management functions for supporting management of the UAVs 102 based on use of GUIs, where the vehicle management application 115 may support various GUIs configured to support presentation of and interaction with various information and controls associated with supporting management of the UAVs 102. It is noted that examples of GUIs which may be supported by vehicle management application 115 are presented with respect to FIGS. 3A and 3B, FIG. 4, and FIGS. 5A-5C.

It will be appreciated that the vehicle management system 110 may be implemented in other ways for supporting management of the UAVs 102.

The communication network 120 is configured to support communications of the UAVs 102 and the vehicle management system 110. The communication network 120 is configured to support communications between the UAVs 102 and the vehicle management system 110 (including wireless communications of the UAVs 102 for accessing communication network 120). The communication network 120 may represent various networks and associated communications capabilities which may be used to support such communications. For example, the communication network 120 may be considered to include public communication networks (e.g., the Internet or the like), private communication networks (e.g., datacenter networks, virtual private networks (VPNs), enterprise networks, or the like), or the like, as well as various combinations thereof. The communication network 120 may support various other types of communications for management of the UAVs 102 in various other ways.

As discussed above and further hereinbelow, GUIs generated and presented by the vehicle management system 110 for supporting management of the UAVs 102 via the communication network 120 may represent various characteristics of the UAVs 102 in various ways. It is noted that examples of at least some such embodiments may be further understood by way of reference to FIGS. 3A and 3B, FIG. 4, and FIGS. 5A-5C.

In at least some embodiments, the UAVs 102 may be represented within a GUI using respective vehicle objects representing the UAVs 102. The vehicle objects associated with the UAVs 102 are graphical objects configured to represent the UAVs 102, respectively. The vehicle objects may be provided using various types of icons (e.g., generic icons, icons that convey an indication of the vehicle type (e.g., helicopter drone versus quadcopter drone), or the like).

In at least some embodiments, altitudes of the UAVs 102 may be represented within a GUI using altitude columns associated with the UAVs 102. The altitude columns associated with the UAVs 102 are graphical objects configured to represent the altitudes of the UAVs 102, respectively. The altitude columns may be represented using lines, bars, or other suitable types of graphical objects. The altitude columns are configured such that the heights of the altitude columns represent the altitudes of the UAVs 102. The heights of the altitude columns representing the altitudes of the UAVs 102 may be related to the altitudes of the UAVs 102 in various ways (e.g., using linear scaling, using logarithmic scaling, or the like). It is noted that the use of altitude columns as presented herein provides significant improvements in user friendliness of vehicle tracking applications by users, enabling improved visualization of vehicle altitude information as well as other vehicle-related information which may be displayed in conjunction with vehicle altitude information. It is noted that examples of GUIs using altitude columns to represent altitudes of UAVs 102 are presented in FIGS. 3A and 3B and FIG. 4.

In at least some embodiments, as noted above, the altitudes of the UAVs 102 may be represented within a GUI using linear scaling. The altitude columns representing the altitudes of the UAVs 102 may be related to the altitudes of the UAVs 102 linearly. For example, if the altitudes of UAVs 102-1 and 102-2 are 10 meters and 20 meters, respectively, then the height of the altitude column representing the altitude of UAV 102-1 will be half or about half of the height of the altitude column representing the altitude of UAV 102-2. It is noted that use of linear scaling for the representing the heights of the altitude columns of the UAVs 102 may give a more direct or accurate representation of the actual altitudes of the UAVs 102, may enable easier comparisons of altitudes between UAVs 102, may make it easier to visualize vertical speed (which, as noted above, may be useful during takeoff and landing of the UAVs 102), and so forth. It is noted that use of linear scaling for the representing the heights of the altitude columns of the UAVs 102 may be useful under various conditions. For example, use of linear scaling for the representing the heights of the altitude columns of the UAVs 102 may be useful during takeoff and landing as linear scaling may make it easier to visualize vertical speed, when the UAVs 102 are flown at relatively low altitudes (e.g., when an altitude of a highest UAV 102 is below a threshold, when an average altitude of the UAVs 102 is below a threshold, or the like) such that logarithmic scaling may be unnecessary or undesirable, when the range of altitudes of the UAVs 102 is below a threshold (e.g., such that it is expected that the UAVs 102 will be flown using relatively similar altitudes) such that logarithmic scaling may be unnecessary or undesirable), when GUI display settings (e.g., view size, zoom level, or the like) are set in a particular way conducive to use of linear scaling, or the like, as well as various combinations thereof. It is noted that use of linear scaling for the representing the heights of the altitude columns of the UAVs 102 may provide various other advantages under various other conditions.

In at least some embodiments, as noted above, the altitudes of the UAVs 102 may be represented within a GUI using logarithmic scaling. The altitude columns representing the altitudes of the UAVs 102 may be related to the altitudes of the UAVs 102 logarithmically (e.g., using base 2, base 10, or any other suitable logarithmic scaling basis). For example, if the altitudes of UAVs 102-1 and 102-2 are 10 meters and 20 meters, respectively, and base 10 logarithmic scaling is used, then the height of the column representing the altitude of UAV 102-1 will be 76% or about 76% of the height of the column representing the altitude of UAV 102-2. It is noted that use of logarithmic scaling for the representing the heights of the altitude columns of the UAVs 102 ensures that the heights of the altitude columns of the UAVs 102 cannot grow inconveniently tall (thereby tending to ensure that the altitude columns of the UAVs 102 do not obstruct the view of other elements of the GUI and do not disappear from view on the GUI), enables highlighting of the relatively low altitudes (which are typically the most important to observe when controlling an aerial vehicle (e.g., during takeoff and landing)), and so forth. It is noted that use of logarithmic scaling for the representing the heights of the altitude columns of the UAVs 102 may be useful under various conditions. For example, use of logarithmic scaling for the representing the heights of the altitude columns of the UAVs 102 may be useful when the UAVs 102 are flown at relatively high altitudes (e.g., when an altitude of a highest UAV 102 is above a threshold, when an average altitude of the UAVs 102 is above a threshold, or the like), when the range of altitudes of the UAVs 102 is above a threshold (e.g., for enabling more compact representation of altitudes of the UAVs 102 when the UAVs 102 are flown at different altitudes), when GUI display settings (e.g., view size, zoom level, or the like) are set in a particular way conducive to use of logarithmic scaling, or the like, as well as various combinations thereof. It is noted that use of logarithmic scaling for the representing the heights of the altitude columns of the UAVs 102 may provide various other advantages under various other conditions.

In at least some embodiments, altitude columns representing the altitudes of the UAVs 102 may be presented in a GUI such that the altitude columns are associated with the vehicle objects representing the UAVs 102 (e.g., connected to the objects representing the UAVs 102 (e.g., extending below or above the vehicle objects representing the UAVs 102), arranged near the vehicle objects representing the UAVs 102, or the like). It is noted that examples of GUIs in which the altitude columns representing the altitudes of the UAVs 102 are associated with the vehicle objects representing the UAVs 102 are presented in FIGS. 3A and 3B.

In at least some embodiments, altitude columns representing the altitudes of the UAVs 102 may be presented in a GUI such that the altitude columns are separate from the vehicle objects representing the UAVs 102 (e.g., located in a different portion of the GUI). It is noted that an example of a GUI in which the altitude columns representing the altitudes of the UAVs 102 are separate from the vehicle objects representing the UAVs 102 is presented FIG. 4.

In at least some embodiments, altitude columns representing the altitudes of the UAVs 102 may be presented in a GUI that also includes a map of the geographic region 101. The altitude columns representing the altitudes of the UAVs 102 may overlay the map of the geographic region 101 (an example of which is presented in FIG. 3A). The altitude columns representing the altitudes of the UAVs 102 may be presented in a portion of the GUI separate from a portion of the GUI in which the map of the geographic region 101 is presented (examples of which are presented in FIGS. 2B and 3), such that the altitude columns representing the altitudes of the UAVs 102 do not overlay the map of the geographic region 101 (e.g., the map of the geographic region 101 is provided in a first region of the GUI and the altitude columns representing the altitudes of the UAVs 102 are provided in a second region of the GUI, where the first region of the GUI and the second region of the GUI are non-overlapping). The map of the geographic region 101 may be a perspective map. The map of the geographic region 101 may be in any suitable mapping format (e.g., satellite, street, terrain, topographic, or the like).

In at least some embodiments, altitude columns representing the altitudes of the UAVs 102 may be presented in a GUI that does not include a map of the geographic region 101. The altitude columns representing the altitudes of the UAVs 102 may be presented in a GUI that only includes the altitude columns representing the altitudes of the UAVs 102 or may be presented in a GUI that includes other information related to the UAVs 102 (e.g., overall information for the group of UAVs 102, UAV-specific information for all or a subset of the UAVs 102, or the like, as well as various combinations thereof). It is noted that, while an example GUI illustrating such an embodiment has been omitted, such a GUI may be provided using the example GUIs of FIGS. 3A and 3B and FIG. 4 where the map of the geographic region 101 has been removed.

In at least some embodiments, altitude columns representing the altitudes of the UAVs 102 may be presented in a GUI in conjunction with presentation of a graph. The graph may have a first axis (e.g., the y-axis) that is an altitude axis marked with altitude values which may be used to indicate the heights of the altitude columns that are presented along the direction of the first axis for the UAVs 102. It at least some embodiments, the graph may have a second axis which may be used to provide additional information for one or more UAVs 102 (e.g., the axis is a time axis for showing how the altitude(s) of the UAV(s) 102 change(s) over time, the axis is a location axis (e.g., a latitude or longitude axis)

for showing how the altitude(s) of the UAV(s) 102 change(s) by location, or the like). It is noted that use of such a graph for providing altitude column height information may be useful within the context of a GUI in which the altitude columns are separate from the UAVs 102. It is noted that an example of a GUI in which the altitude columns representing the altitudes of the UAVs 102 are presented in conjunction with presentation of a graph is presented FIG. 4.

In at least some embodiments, the GUI including altitude columns representing the altitudes of the UAVs 102 may be initialized to use linear scaling or logarithmic scaling for the heights of the altitude columns representing the altitudes of the UAVs 102. The GUI including altitude columns representing the altitudes of the UAVs 102 may be initialized to use linear scaling or logarithmic scaling for the heights of the columns representing the altitudes of the UAVs 102 based on various information or conditions. For example, the determination as to whether the GUI including altitude columns representing the altitudes of the UAVs 102 is initialized to use linear scaling or logarithmic scaling for the heights of the altitude columns representing the altitudes of the UAVs 102 may be based on whether or not the UAVs 102 are already flying (e.g., using linear scaling where the UAVs 102 are not already flying and are going to take off and using logarithmic scaling where the UAVs 102 are already flying), information indicative of expected altitudes or actual altitudes of the UAVs 102 (e.g., using linear scaling where the UAVs 102 are expected to fly or are flying relatively low and using logarithmic scaling where the UAVs 102 are expected to fly or are flying relatively high), information indicative of an expected or actual range of altitudes of the UAVs 102 (e.g., using linear scaling where the expected or actual range of altitudes is below a threshold and using logarithmic scaling where the expected or actual range of altitudes is above a threshold), one or more existing or expected GUI display settings (e.g., view size, zoom level, or the like), or the like, as well as various combinations thereof. For example, linear scaling may be used where the altitude of a highest UAV 102 is below a threshold and logarithmic scaling may be used where the altitude of the highest UAV 102 is above a threshold. For example, linear scaling may be used where a difference between the highest and lowest altitudes of the UAVs 102 is below a threshold and logarithmic scaling may be used where a difference between the highest and lowest altitudes of the UAVs 102 is above a threshold. In at least some embodiments, the GUI including altitude columns representing the altitudes of the UAVs 102 may be initialized to use linear scaling for the heights of the altitude columns representing the altitudes of the UAVs 102, as linear scaling may make it easier to visualize vertical speed (which may be important during the initial takeoff phase in which the UAVs 102 take off). It is noted that the GUI including altitude columns representing the altitudes of the UAVs 102 may be initialized to use linear scaling or logarithmic scaling for the heights of the altitude columns representing the altitudes of the UAVs 102 based on various other types of information or conditions.

In at least some embodiments, the GUI including altitude columns representing the altitudes of the UAVs 102 may be dynamically updated to switch between linear scaling and logarithmic scaling for the heights of the altitude columns representing the altitudes of the UAVs 102. The GUI including altitude columns representing the altitudes of the UAVs 102 may be dynamically switched between linear scaling and logarithmic scaling for the heights of the altitude columns representing the altitudes of the UAVs 102 based on various information or conditions. For example, the determination as to whether the GUI including altitude columns representing the altitudes of the UAVs 102 is dynamically updated to switch between linear scaling and logarithmic scaling for the heights of the altitude columns representing the altitudes of the UAVs 102 may be based on changes in the altitudes of the UAVs 102 (e.g., switching from linear to logarithmic where at least some of the altitudes move above a threshold or switching from logarithmic to linear where at least some of the altitudes move below a threshold), based on changes in the range of altitudes of the UAVs 102 (e.g., switching from linear to logarithmic where the range of altitudes moves above a threshold or switching from logarithmic to linear where the range of altitudes moves below a threshold), a change in GUI display settings, or the like, as well as various combinations thereof. For example, a switch to linear scaling may be initiated where the altitude of a highest UAV 102 drops below a threshold and a switch to logarithmic scaling may be initiated where the altitude of the highest UAV 102 rises above a threshold. For example, a switch to linear scaling may be initiated where a difference between the highest and lowest altitudes of the UAVs 102 drops below a threshold and switch to logarithmic scaling may be initiated where a difference between the highest and lowest altitudes of the UAVs 102 rises above a threshold. It is noted that the GUI including altitude columns representing the altitudes of the UAVs 102 may be dynamically modified to switch between linear scaling and logarithmic scaling for the heights of the altitude columns representing the altitudes of the UAVs 102 based on various other types of information or conditions.

In at least some embodiments, altitude columns representing the altitudes of the UAVs 102 may be presented in a GUI in various ways. The altitude columns representing the altitudes of the UAVs 102 may be presented for all of the UAVs 102, a subset of UAVs 102, or individual UAVs 102. The set of UAVs 102 for which the altitude columns representing the altitudes of the respective UAVs 102 are presented may be set manually or may be set automatically based on one or more conditions. The set of UAVs 102 for which the altitude columns representing the altitudes of the respective UAVs 102 are presented may be initialized to include all of the UAVs 102 (e.g., until a certain minimum altitude threshold is reached), a subset of the UAVs 102 (e.g., based on geographic location, mission goals, or the like), none of the UAVs 102 (e.g., until a certain minimum altitude threshold is reached), or the like. The set of UAVs 102 for which the altitude columns representing the altitudes of the respective UAVs 102 are presented may be switched dynamically, e.g., manually (e.g., where a user requests to receive altitude information for particular sets of UAVs 102) or automatically based on one or more conditions (e.g., based on crossing of minimum and maximum altitude thresholds or other conditions). The switching between such levels of granularity for presentation of the altitude columns representing the altitudes of the respective UAVs 102 may be performed within a given GUI (e.g., replacing altitude information that is currently displayed for a given set of UAVs 102 with altitude information for a different set of UAVs 102) or may be performed using multiple GUIs (e.g., triggering one or more additional GUIs including the altitude information for a particular UAV 102 or set of UAVs 102 based on the detection of an indication that altitude information for the particular UAV 102 or set of UAVs 102 should be presented). For example, where altitude columns representing altitudes of all of the UAVs 102 are presented in a GUI, selection of one or more of the UAVs 102 by a user via the GUI may result in display, within the same GUI or a different GUI, of altitude information specific to the one or more UAVs 102. For example, where altitude columns representing altitudes of all of the UAVs 102 are presented in a GUI, detection of a condition with one of the UAVs 102 (e.g., altitude crossing a threshold) may result in display, within the same GUI or a different GUI, of altitude information specific to the one of the UAVs 102. It will be appreciated that altitude columns representing altitudes of UAVs 102 may be presented at various other levels of granularity, that such levels of granularity may be controlled in various other ways, or the like, as well as various combinations thereof.

In at least some embodiments, altitude columns representing the altitudes of the UAVs 102 may be presented in a GUI that also includes additional information.

The additional information may include values of the altitudes of the UAVs 102. The values of the altitudes of the UAVs 102 may be provided at the bottoms of the altitude columns representing the altitudes of the UAVs 102, at the tops of the altitude columns representing the altitudes of the UAVs 102, next to the altitude columns representing the altitudes of the UAVs 102, or in various other locations within the GUI (e.g., associated with the altitude columns representing the altitudes of the UAVs 102, independent of the altitude columns representing the altitudes of the UAVs 102, or the like). In at least some embodiments, the values of the altitudes of the UAVs 102 may only be presented under certain conditions and may be dynamically hidden or removed under other conditions. For example, the value of the altitude of a given UAV 102-x may only be presented where the altitude of the given UAV 102-x is below a threshold minimum altitude (e.g., as an indicator that the UAV 102 is dangerously low and may be in danger of hitting something on the ground or even crashing into the ground), where the altitude of the given UAV 102-x is above a threshold maximum altitude (e.g., as an indicator that the UAV 102 is dangerously high and may be in danger of too much shear winds or being out of range of communication), or the like. For example, the value of the altitude of a given UAV 102-x may be hidden or removed where the altitude of the given UAV 102-x is above a threshold minimum altitude, where the altitude of the given UAV 102-x is below a threshold maximum altitude, or the like. It will be appreciated that various other conditions may be used to dynamically control display of altitudes of UAVs 102 at various levels of granularity (e.g., for individual UAVs 102, subsets of UAVs 102, all UAVs 102, or the like).

The additional information may include battery status information for batteries of the UAVs 102. The battery status information for batteries of the UAVs 102 may be represented in various ways (e.g., using battery status indictor objects (e.g., which may graphically display battery status using bars, lines, or other graphical indicators), using battery status values (e.g., represented as a percentage of battery remaining or using other suitable values), or the like, as well as various combinations thereof). The battery status information of the UAVs 102 may be provided at the bottoms of the altitude columns representing the altitudes of the UAVs 102, at the tops of the altitude columns representing the altitudes of the UAVs 102, next to the altitude columns representing the altitudes of the UAVs 102, or in various other locations within the GUI (e.g., associated with the altitude columns representing the altitudes of the UAVs 102, independent of the altitude columns representing the altitudes of the UAVs 102, or the like). In at least some embodiments, the battery status information of the UAVs 102 may only be presented under certain conditions and may be dynamically hidden or removed under other conditions. For example, battery status information of a given UAV 102-x may only be presented where the amount of battery charge remaining for the given UAV 102-x is below a threshold minimum value (e.g., as an indicator that the battery of the UAV 102 is dangerously low and, thus, that the given UAV 102-x may be in danger of running out of power and crashing). For example, the battery status information of a given UAV 102-x may be hidden or removed where the amount of battery charge remaining for the given UAV 102-x is above a threshold minimum value. It will be appreciated that various other conditions may be used to dynamically control display of battery status information of UAVs 102 at various levels of granularity (e.g., for individual UAVs 102, subsets of UAVs 102, all UAVs 102, or the like).

It will be appreciated that various other types of additional information may be presented within a GUI that includes altitude columns representing the altitudes of the UAVs 102. It will be appreciated that additional information presented within a GUI that includes altitude columns representing the altitudes of the UAVs 102 may be presented in various other ways.

In at least some embodiments, the UAVs 102 may be represented within a GUI using various levels of detail. The levels of detail may include a maximum level of detail, a reduced level of detail, and a minimum level of detail. In the maximum level of detail, for example, the information that is displayed may include full vehicle icons (e.g., having shapes reflecting the shapes of the UAVs 102), location information, altitude columns, altitude values, battery status information, and so forth). In the reduced level of detail, the information that is displayed may include generic vehicle icons (e.g., dots or squares that do not reflect the shapes of the UAVs 102), location information, and altitude columns, with other information of the maximum level of detail being omitted (e.g., altitude values, battery status information, and so forth). In the minimum level of detail, the information that is displayed may include generic vehicle icons (e.g., dots or squares that do not reflect the shapes of the UAVs 102), with other information of the reduced level of detail being omitted (e.g., altitude columns). It will be appreciated that the information that is displayed in any particular level of detail may be different. It will be appreciated that any suitable number of detail levels may be supported and that selection of and switching between detail levels may be based on various conditions (e.g., number of UAVs 102 represented, heights of UAVs represented, end user preferences, or the like, as well as various combinations thereof). It is noted that examples of GUIs using different levels of detail to represent UAVs 102 are presented in FIGS. 4A-4C.

It will be appreciated that various characteristics of the UAVs 102 may be represented within GUIs in various other ways.

It will be appreciated that vehicle management environment 100 may be implemented in various other ways while still supporting representation of UAVs 102 within GUIs for supporting management of the UAVs 102.

Figure 2:
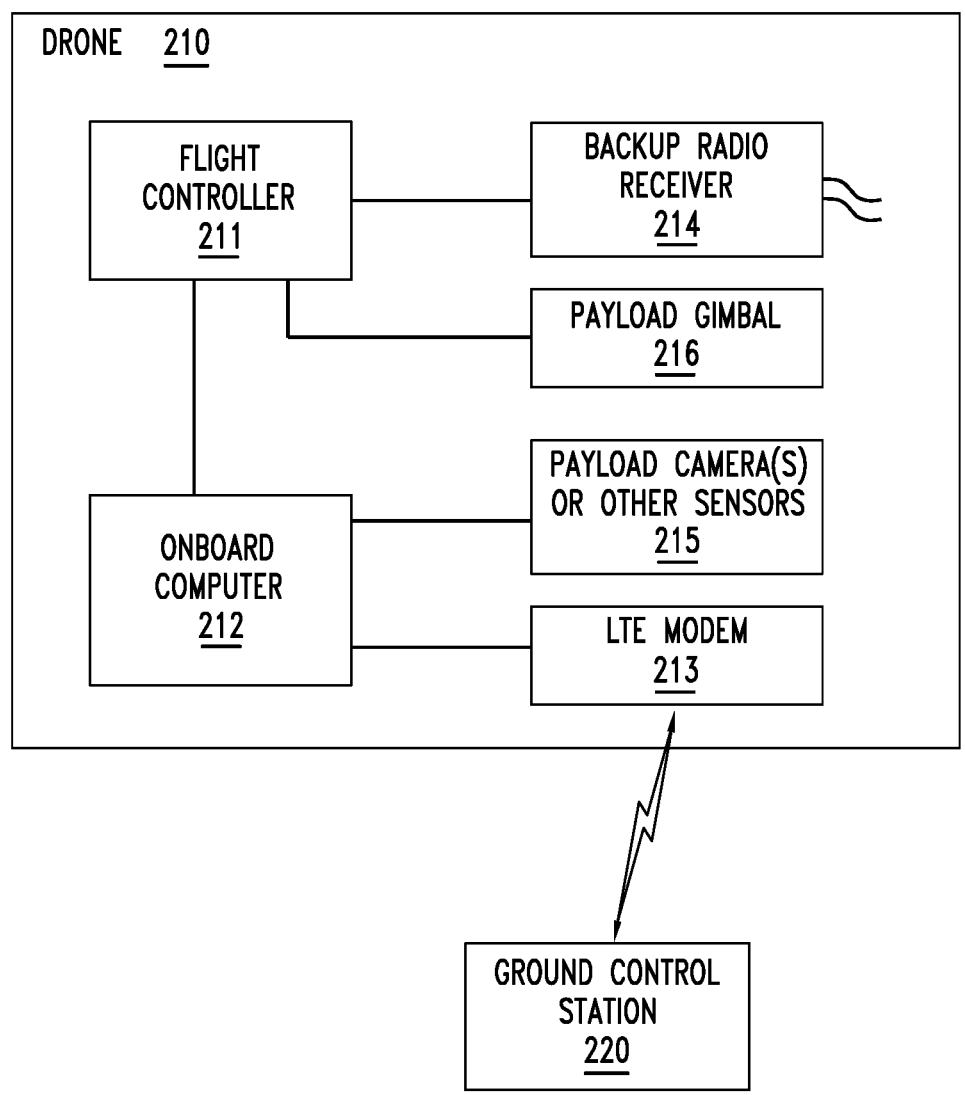
FIG. 2 depicts an example of a portion of a vehicle management environment including a drone suitable for use as a UAV of FIG. 1 and a ground control system suitable for use in supporting the vehicle management system of FIG. 1.

FIG. 2 depicts an example of a portion of a vehicle management environment including a drone suitable for use as a UAV of FIG. 1 and a ground control system suitable for use in supporting the vehicle management system of FIG. 1.

The vehicle management environment 200 includes a drone 210 that is configured to wirelessly communicate with a ground control station 220.

The drone 210 is depicted as including various components. It will be appreciated that, although omitted from FIG.

2 for purposes of clarity, a drone, such as drone 210, typically includes a frame, propellers, motors, a battery, and an external GPS module, among other components. The drone 210 includes a flight controller 211, an onboard computer 212, an LTE modem 213, a backup radio receiver 214, a payload device 215, and a payload gimbal 216.

The flight controller 211 (remotely wirelessly) controls the motors and handles the low-level autopilot logic. The flight controller 211 is connected to the onboard computer 212 for control messages. The flight controller 211 is connected to the backup radio receiver 214 which can be used as backup control method (enabling control over the drone 210 using a traditional radio controller in case the LTE connection via the LTE modem 213 is lost for some reason). The flight controller 211 is also connected to payload gimbal 216.

The onboard computer 212 includes custom software that is configured to make the system work. The onboard computer 212 connects the flight controller 211 to the ground control station 220 via LTE using the LTE modem 213. The onboard computer 212 provides access to payload data from the payload device 215 (e.g., video feeds from a video camera where, as in drone 210, the payload device 215 is a video camera). The onboard computer 212 may store delay-sensitive logic in order to ensure responsiveness.

It will be appreciated that the drone 210 may include various other elements, that the elements of drone 210 may be organized in various other ways, or the like, as well as various combinations thereof.

The ground control station 220 may be configured to provide various functions presented herein as being provided by vehicle control system 110. The ground control station 220 may include various hardware and software components configured for communication with and control over the drone 210. The ground control station 220 may include computers, human-machine interfaces, and other components which may be used for controlling observing and controlling flight, uploading mission commands, receiving and presenting status information (e.g., drone status, missions status, or the like, as well as various combinations thereof), monitoring live video streams, or the like, as well as various combinations thereof. The ground control station 220 may include various other elements, support various other functions and capabilities, or the like, as well as various combinations thereof.

It will be appreciated that the drone 210 is merely one example of a drone which may be used as a UAV 102 of FIG. 1 and, similarly, that the ground control station 220 is merely one example of a ground control station suitable for use in supporting the vehicle management system 110 of FIG. 1.

Figure 3A:
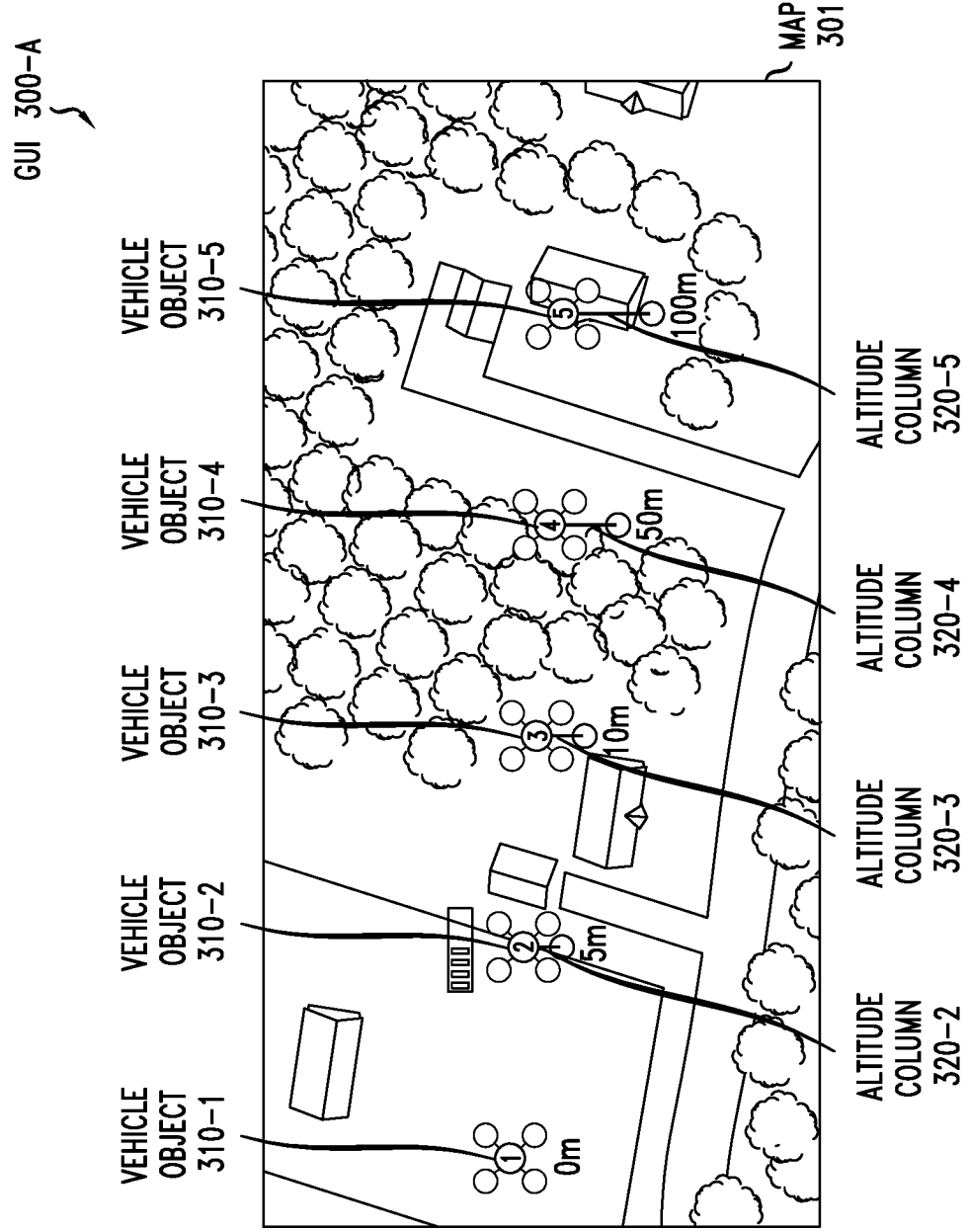
FIGS. 3A and 3B depict example GUIs illustrating marking of vehicle altitudes of UAVs using altitude columns where the altitude columns are associated with vehicle objects representing the UAVs.
Figure 3B:
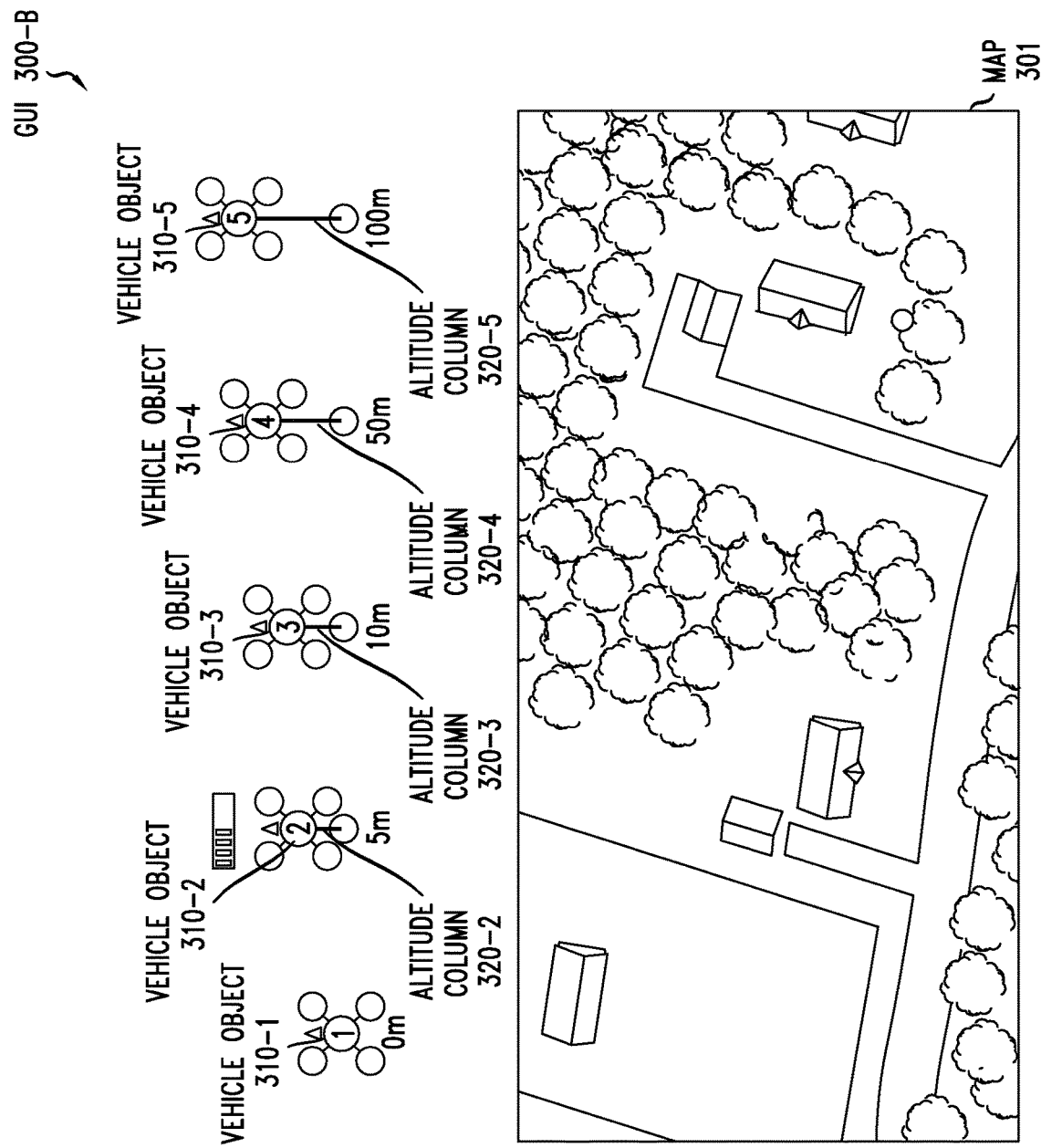

FIGS. 3A and 3B depict example GUIs illustrating marking of vehicle altitudes of UAVs using altitude columns where the altitude columns are associated with vehicle objects representing the UAVs. The GUIs 300 of FIGS. 3A and 3B each depict a map 301. The map 301 is a map of the geographic region within which five UAVs (which may be referred to as UAV1 through UAV5) are operating. The GUIs 300 of FIGS. 3A and 3B each depict vehicle objects 310 representing the five UAVs (illustratively, vehicle object 310-1 representing UAV1, vehicle object 310-2 representing UAV2, vehicle object 310-3 representing UAV3, vehicle object 310-4 representing UAV4, and vehicle object 310-5 representing UAV5). The GUIs 300 of FIGS. 3A and 3B each depict altitude columns 320 representing the altitudes of the five UAVs (illustratively, altitude column 320-2 representing the altitude of UAV2, altitude column 320-3 representing the altitude of UAV3, altitude column 320-4 representing the altitude of UAV4, and altitude column 320-5 representing the altitude of UAV5). It is noted that an altitude column is not depicted for UAV1, because the altitude of UAV1 is 0 m. In the GUIs 300 of FIGS. 3A and 3B, the heights of the altitude columns 320 are logarithmically scaled. The difference between the GUIs 300 of FIGS. 3A and 3B is that in the GUI 300-A of FIG. 3A the representations of the UAVs (vehicle objects 310 and altitude columns 320) overlap the map 301, whereas in the GUI 300-B of FIG. 3B the representations of the UAVs (vehicle objects 310 and altitude columns 320) do not overlay the map 301 (illustratively, the map 301 and the representations of the UAVs are provided in different, non-overlapping portions of the GUI 300-B). It is noted that the GUIs 300 of FIGS. 3A and 3B also include altitude values of the UAVs, with the altitude values being presented such that the altitude values are associated with the altitude columns 320 (illustratively, the altitude values are displayed below the altitude columns 320). It is noted that the GUIs 300 of FIGS. 3A and 3B also include a battery status indictor object for UAV2 as the battery level of UAV2 has fallen to a threshold level of 50% of the battery remaining. It will be appreciated that the GUIs 300 of FIGS. 3A and 3B are merely examples and that these GUIs may include less or more information, the information of these GUIs may be organized in other ways, or the like, as well as various combinations thereof.

Figure 4:
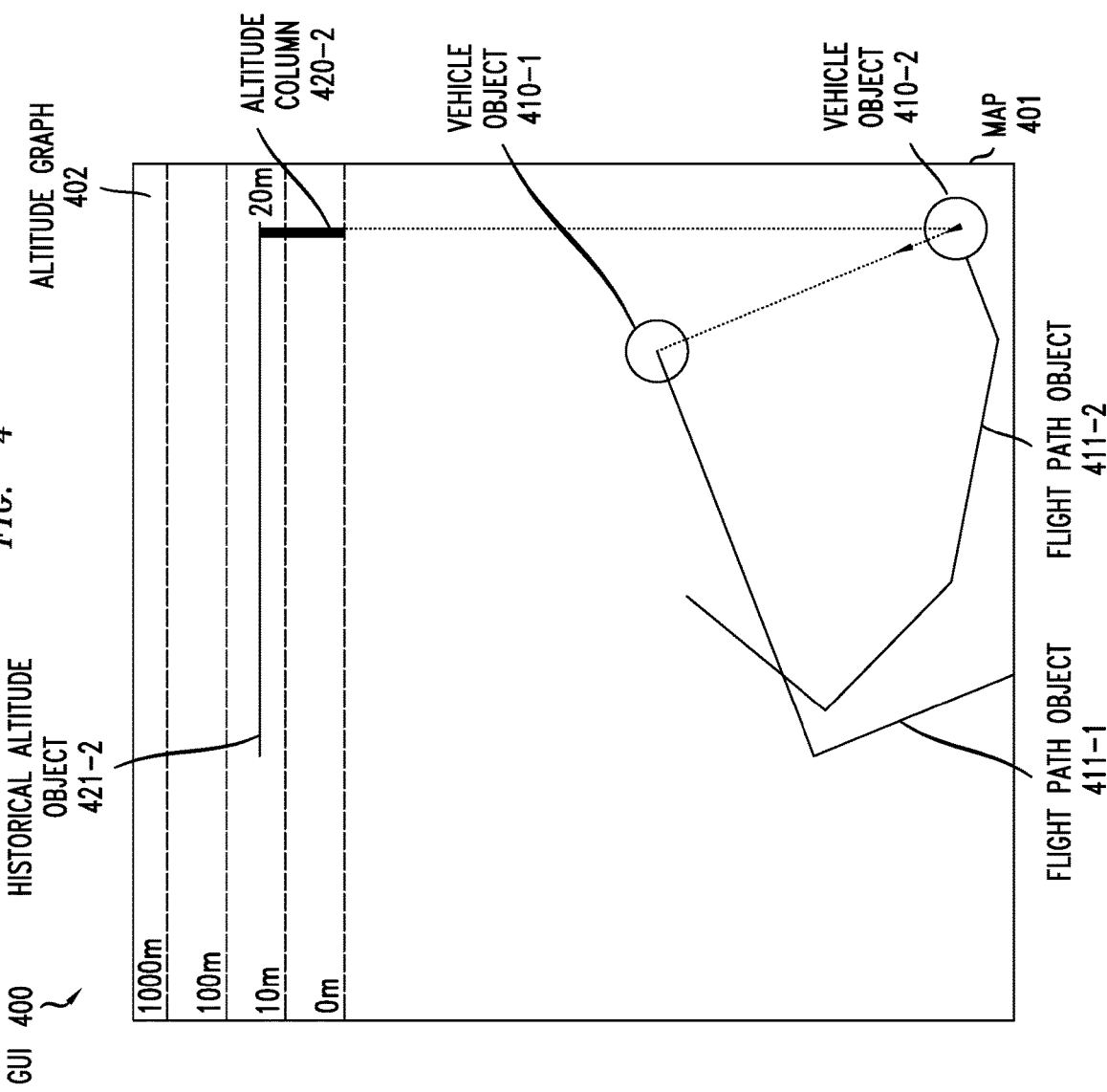
FIG. 4 depicts an example GUI illustrating marking of vehicle altitudes of UAVs using altitude columns where the altitude columns are separate from the vehicle objects representing the UAVs.

FIG. 4 depicts an example GUI illustrating marking of vehicle altitudes of UAVs using altitude columns where the altitude columns are separate from the vehicle objects representing the UAVs. The GUI 400 of FIG. 4 depicts a map 401 and an altitude graph 402. The map 401 is a map of the geographic region within which two UAVs (which may be referred to as UAV1 and UAV2) are operating. The altitude graph 402 is a region of the GUI 400 supporting presentation of altitude information for the two UAVs, and includes a y-axis configured to support representation of the altitudes of the two UAVs using logarithmic scaling (illustratively, equal increments on the altitude graph 402 mark altitudes of 0 m, 10 m, 100 m, and 1000 m). The GUI 400 of FIG. 4 depicts vehicle objects 410 representing the two UAVs (illustratively, vehicle object 410-1 representing UAV1 and vehicle object 410-2 representing UAV2). The vehicle objects 410 overlap map 401. The GUI 400 of FIG. 4 also depicts the flight paths of the two UAVs, within the geographic region represented by the map 410, using flight path objects 411 provided in the form of lines connected to the vehicle objects 410 (illustratively, flight path object 411-1 for UAV1 and flight path object 411-2 for UAV2). The GUI 400 of FIG. 4 depicts an altitude column 420-2 representing the altitude of a selected one of the two UAVs (illustratively, UAV2, as indicated by the dashed line from the vehicle object 410-2 representing UAV2 up to the altitude column 420-2 representing the altitude UAV2). In the GUI 400 of FIG. 4, as indicated above, the height of the altitude column 420-2 is logarithmically scaled. The GUI 400 of FIG. 4 also depicts an historical altitude object 421-2 associated with UAV2, which represents the changes in the altitude of UAV2 for some variable (e.g., location, time, or the like). In the GUI 400 of FIG. 4, it may be seen, from the historical altitude object 421-2, that the altitude of UAV2 has remained constant at 25 m. It will be appreciated that, although omitted from FIG. 4 for purposes of clarity, in an unselected state (in which no single UAV is selected), the altitude columns 420 for each of the UAVs may be represented in the altitude graph 402 (e.g., in numeric order independent of the locations of the vehicle objects 410 in the map 401, in altitude order (e.g., highest to lowest or lowest to highest)

independent of the locations of the vehicle objects 410 in the map 401, such that the locations of the altitude columns 420 in the altitude graph 402 track the locations of the vehicle objects 410 in the map 401 (e.g., moving left-right in the altitude graph 402 as the vehicle objects 410 move left-right in the map 401), or the like, as well as various combinations thereof). It will be appreciated that the GUI 400 of FIG. 4 is merely an example and that this GUI may include less or more information, the information of this GUI may be organized in other ways, or the like, as well as various combinations thereof.

Figure 5:
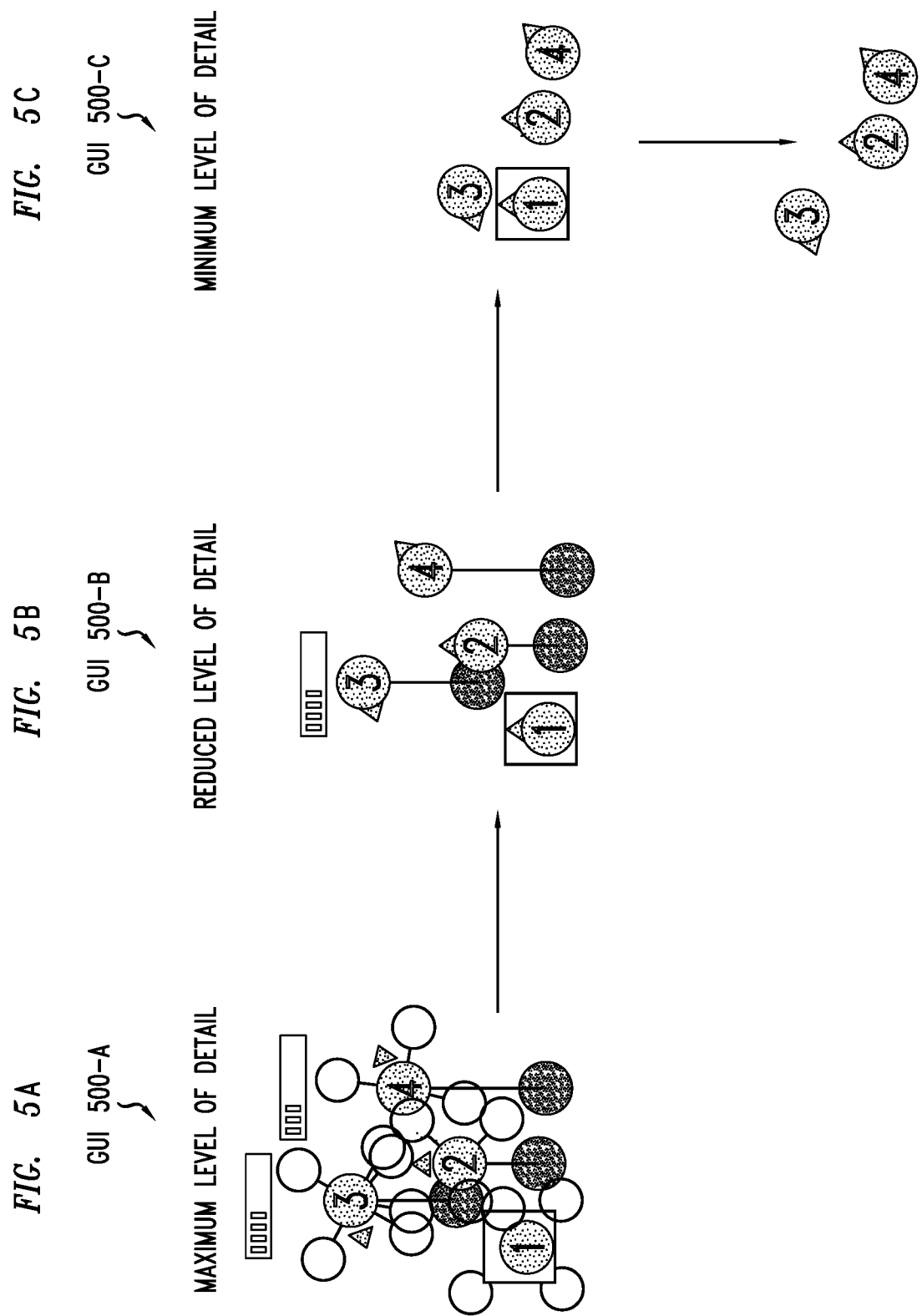
FIGS. 5A-5C depict example GUIs illustrating representation of UAVs using different levels of detail.

FIGS. 5A-5C depict example GUIs illustrating representation of UAVs using different levels of detail. In the example GUIs 500 of FIGS. 5A-5C, various details of four UAVs (which may be referred to as UAV1-UAV4) are presented. The GUI 500-A of FIG. 5A provides a maximum level of detail for the four UAVs, displaying various characteristics of the four UAVs (illustratively, full vehicle icons (e.g., having shapes reflecting the shapes of the UAVs 102), location information, altitude columns, altitude values, battery status information, and so forth). However, as may be seen from FIG. 5A, the close proximity of the UAVs results in overlaps in the display of the characteristics of the UAVs such that much of the information is difficult or impossible to see. As such, a manual or automatic switch from the maximum level of detail of FIG. 5A to a lower level of detail (illustratively, the reduced level of detail of FIG. 5B) may be initiated. The GUI 500-B of FIG. 5B provides a reduced level of detail for the four UAVs, displaying less characteristics of the four UAVs as compared with the maximum level of detail provided in the GUI 500-A of FIG. 5A (illustratively, generic vehicle icons (e.g., dots or squares that do not reflect the shapes of the UAVs 102), location information, and altitude columns, with other information of the maximum level of detail being omitted (e.g., altitude values, battery status information, and so forth). However, as may be seen from FIG. 5B, the close proximity of the UAVs still results in some overlaps in the display of the characteristics of the UAVs. As such, a manual or automatic switch from the reduced level of detail of FIG. 5B to a lower level of detail (illustratively, the minimum level of detail of FIG. 5C) may be initiated. The GUI 500-C of FIG. 5C provides a reduced level of detail for the four UAVs, displaying only generic icons for the UAVs and the locations of the UAVs (as shown at the top of the GUI 500-C) or perhaps only displaying information for UAVs in the air (illustratively, UAV1 with the square around it may be removed since it is not flying) as only those UAVs may be of interest (as shown at the top of the GUI 500-C). It will be appreciated that the information that is displayed in any particular level of detail may be different, that fewer or more levels of detail may be supported, that switching between levels of detail may be initiated in various other ways, or the like, as well as various combinations thereof.

It will be appreciated that, although primarily presented herein with respect to embodiments in which a specific type of vehicle measure (namely, vehicle altitude) is represented using a specific type of graphical object (namely, a column having a height associated therewith), information associated with vehicles may include various other types of vehicle measures (e.g., distance, gap, speed, velocity, acceleration, or the like), information associated with vehicles may be represented using various other types of graphical objects (e.g., rows, lines, or the like) having various characteristics associated therewith (e.g., length, width, or the like), or the like, as well as various combinations thereof.

In at least some embodiments, as noted above, the measures for the vehicles may be distances associated with the vehicles. For example, the distance measure for a vehicle may be a measure of a distance between the vehicle and a reference point (e.g., a geographic location (e.g., a mission target location, a home base location, or the like), a location of a vehicle closest to that vehicle, a location of a vehicle farthest from that vehicle, or the like). The distance measure for a vehicle may be represented using a distance column, a distance bar, or other suitable graphical element configured to support use of linear and logarithmic scaling.

In at least some embodiments, as noted above, the measures for the vehicles may be gaps associated with the vehicles. For example, the gap measure for a vehicle may be a measure of a size of a gap between the vehicle and a reference object (e.g., another vehicle (e.g., a vehicle closest to that vehicle, a vehicle farthest from that vehicle, or the like), a manmade object (e.g., a building, a tower, or the like), a natural object (e.g., a tree, a mountainside, or the like), or the like). The gap measure for a vehicle may be represented using a gap column, a gap bar, or other suitable graphical element configured to support use of linear and logarithmic scaling.

In at least some embodiments, as noted above, the measures for the vehicles may be speeds of the vehicles. For example, the speed measure for a vehicle may be a measure of a speed of the vehicle (e.g., absolute speed, relative speed that is relative to a reference object, or the like). The speed measure for a vehicle may be represented using a speed column, a speed bar, or other suitable graphical element configured to support use of linear and logarithmic scaling.

In at least some embodiments, as noted above, the measures for the vehicles may be velocities of the vehicles. For example, the velocity measure for a vehicle may be a measure of a velocity of the vehicle (e.g., absolute velocity, relative velocity that is relative to a reference object, or the like). The velocity measure for a vehicle may be represented using a velocity column, a velocity bar, or other suitable graphical element configured to support use of linear and logarithmic scaling. It will be appreciated that the directional component of velocity also may be represented.

In at least some embodiments, as noted above, the measures for the vehicles may be accelerations of the vehicles. For example, the acceleration measure for a vehicle may be a measure of an acceleration of the vehicle (e.g., absolute acceleration, relative acceleration that is relative to a reference object, or the like). The acceleration measure for a vehicle may be represented using an acceleration column, an acceleration bar, or other suitable graphical element configured to support use of linear and logarithmic scaling.

It will be appreciated that other types of vehicle measures may be supported within the GUIs.

It will be appreciated that various embodiments herein directed to representing vehicle altitudes of vehicles may be adapted or applied for representing other types of vehicle measures (e.g., embodiments depicted and described herein within the context of representing vehicle altitudes of vehicles may be used for representing other vehicle measures such as distance, gap, speed, velocity, acceleration, or the like).

It will be appreciated that, in at least some such embodiments, references herein to an altitude of a vehicle may be read more generally as being a measure of a vehicle, references herein to altitude columns representing altitudes of vehicles may be read more generally as being measure objects representing measures of vehicles, references herein to heights of altitude columns representing altitudes of vehicles may be read more generally as being lengths of measure objects representing measures of vehicles, or the like, as well as various combinations thereof. Various embodiments related to more general representation of vehicle measures using measure objects having associated lengths that are related to the vehicle measures are presented with respect to FIGS. 6-8, which are discussed further below.

Figure 6:
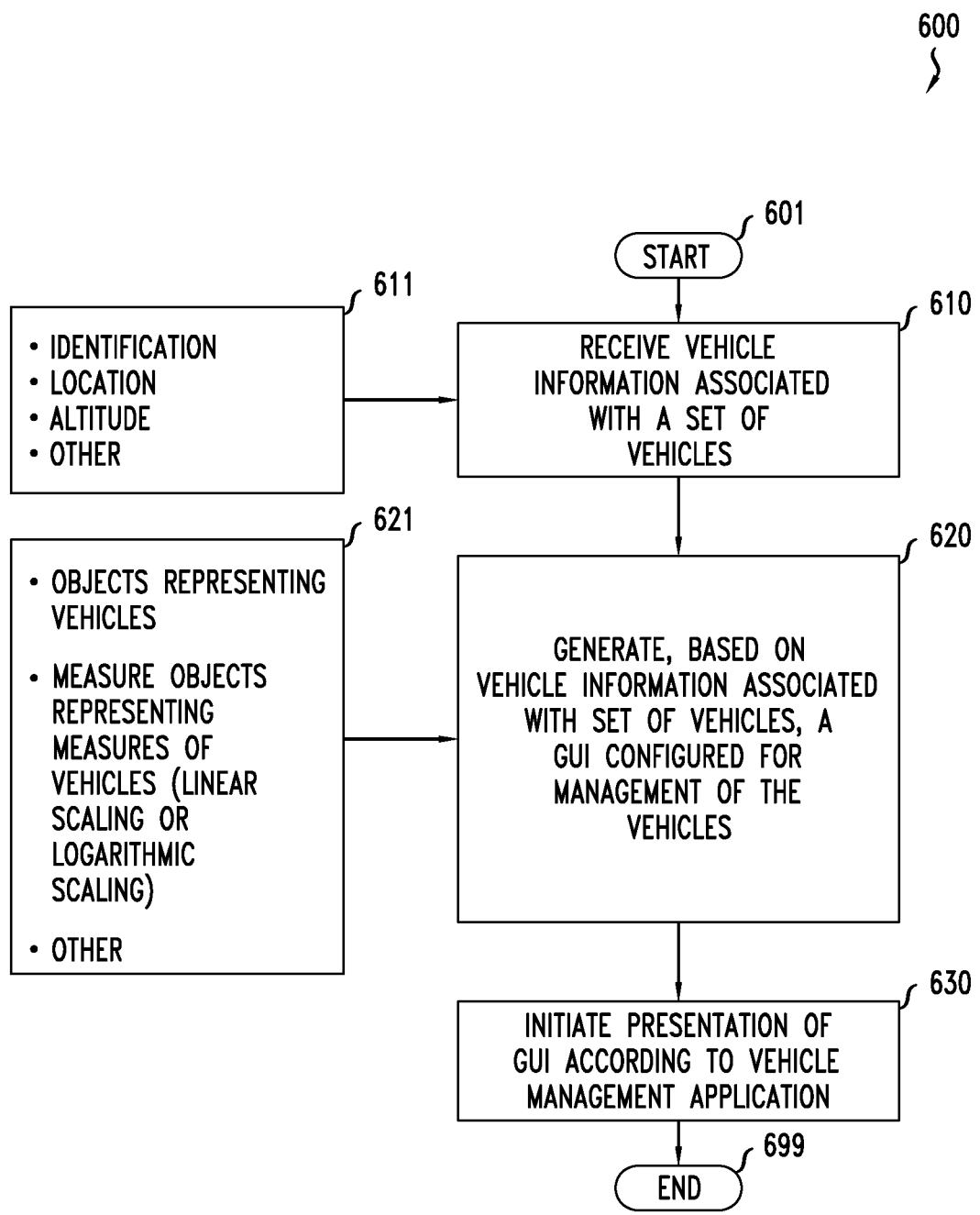
FIG. 6 depicts an embodiment of a method for supporting marking of vehicle measures of vehicles using measure objects that are based on the measures of the vehicles.

FIG. 6 depicts an embodiment of a method for supporting marking of vehicle measures of vehicles using measure objects that are based on the measures of the vehicles. The method 600 of FIG. 6 may be executed by a device, which may be an end user device or a vehicle management controller. It will be appreciated that, although primarily presented as being performed serially, at least a portion of the functions may be performed contemporaneously or in a different order than as presented in FIG. 6. At block 601, method 600 begins. At block 610, vehicle information associated with a set of vehicles is received by the device. The set of vehicles may include one or more vehicles. The set of vehicles may include all of the vehicles in operation or a subset of the vehicles in operation. As indicated by block 611, the vehicle information may include vehicle identification information, vehicle location information, vehicle measure information (e.g., altitude, distance, gap, speed, velocity, acceleration, or the like), or the like. At block 620, a GUI configured for management of the vehicles is generated at the device based on the vehicle information associated with the set of vehicles. As indicated by block 621, the GUI includes one or more vehicle objects representing one or more respective vehicles. As indicated by block 621, the GUI includes one or more measure objects representing respective measures of the one or more vehicles, where respective lengths of the one or more measure objects have a logarithmic scaling in which the respective lengths of the one or more measure objects are logarithmically related to the respective measures of the one or more vehicles. The measures of the vehicles may be altitudes, distances, gaps, speeds, velocities, accelerations, or the like. The measure objects may be columns, lines, or other types of graphical objects configured to have lengths indicative of the measures of the vehicles. As indicated by block 621, the GUI may include other objects and information. At block 630, presentation of the GUI according to a vehicle management application is initiated at the device. The initiation of the presentation of the GUI may include initiating presentation of the GUI at the device (e.g., where the device is the end user device) or sending the GUI from the device toward an end user device for presentation at the end user device. At block 699, method 600 ends.

Figure 7:
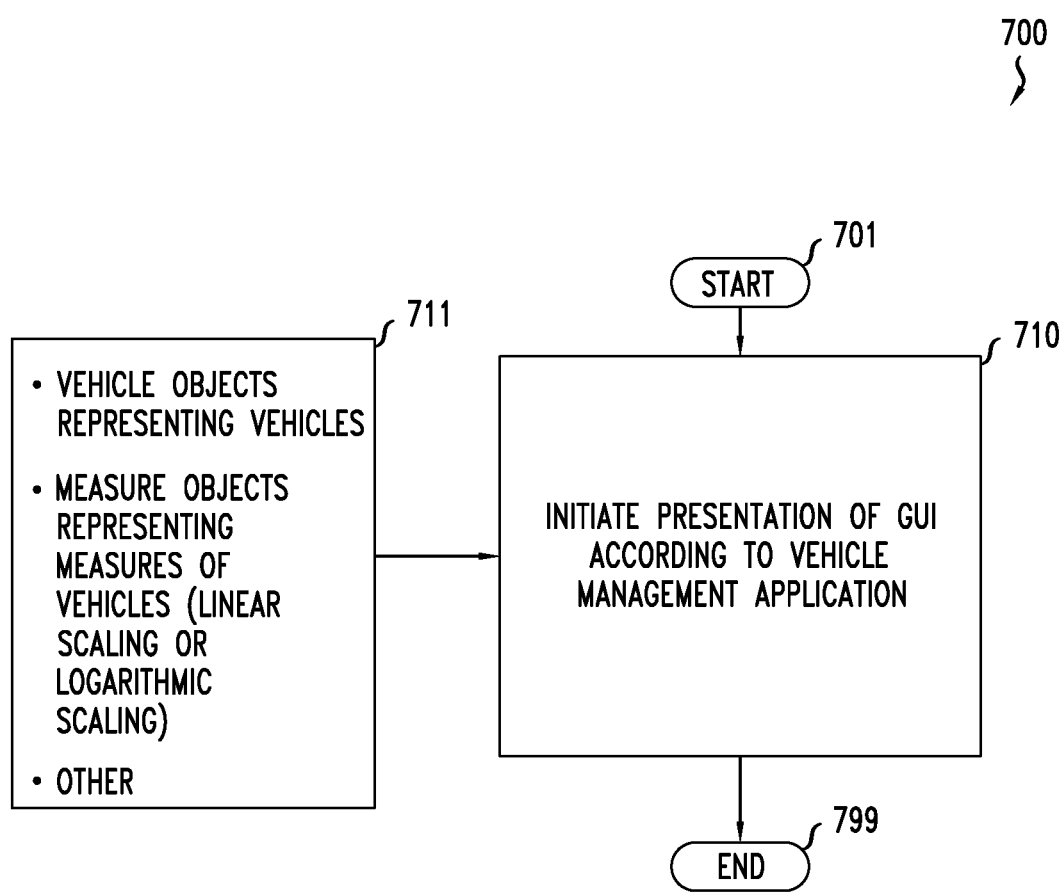
FIG. 7 depicts an embodiment of a method for supporting marking of vehicle measures of vehicles using measure objects that are based on the measures of the vehicles.

FIG. 7 depicts an embodiment of a method for supporting marking of vehicle measures of vehicles using measure objects that are based on the measures of the vehicles. The method 700 of FIG. 7 may be executed by a device, which may be an end user device or a vehicle management controller. At block 701, method 700 begins. At block 710, presentation of a GUI according to a vehicle management application is initiated at the device. As indicated by block 711, the GUI includes one or more vehicle objects representing one or more respective vehicles. As indicated by block 711, the GUI includes one or more measure objects representing respective measures of the one or more vehicles, where respective lengths of the one or more measure objects have a linear scaling in which the respective lengths of the one or more measure objects are linearly related to the respective measures of the one or more vehicles or a logarithmic scaling in which the respective lengths of the one or more measure objects are logarithmically related to the respective measures of the one or more vehicles. The measures of the vehicles may be altitudes, distances, gaps, speeds, velocities, accelerations, or the like. The measure objects may be columns, lines, or other types of graphical objects configured to have lengths indicative of the measures of the vehicles. As indicated by block 711, the GUI may include other objects and information. At block 799, method 700 ends. It will be appreciated that, although omitted for purposes of clarity, block 710 may be preceded by one or more other blocks (e.g., receipt of information configured for use in initiating presentation of the GUI) and/or followed by one or more other blocks (e.g., receipt of commands entered based on the GUI), which may depend on the type of device initiating presentation of the GUI according to the vehicle management application. For example, where the device is an end user device, block 710 may be preceded by a block in which the end user device receives the GUI or in which the end user device receives information for use in generating the GUI (e.g., vehicle information associated with the vehicles) and generates the GUI. For example, where the device is a vehicle management controller, block 710 may be preceded by a block in which the vehicle receives information for use in generating the GUI (e.g., vehicle information associated with the vehicles) and generates the GUI, such that the vehicle management controller may initiate presentation of the GUI by sending the GUI for presentation via at least one other device. It will be appreciated that method 700 of FIG. 7 may be modified in other ways.

Figure 8:
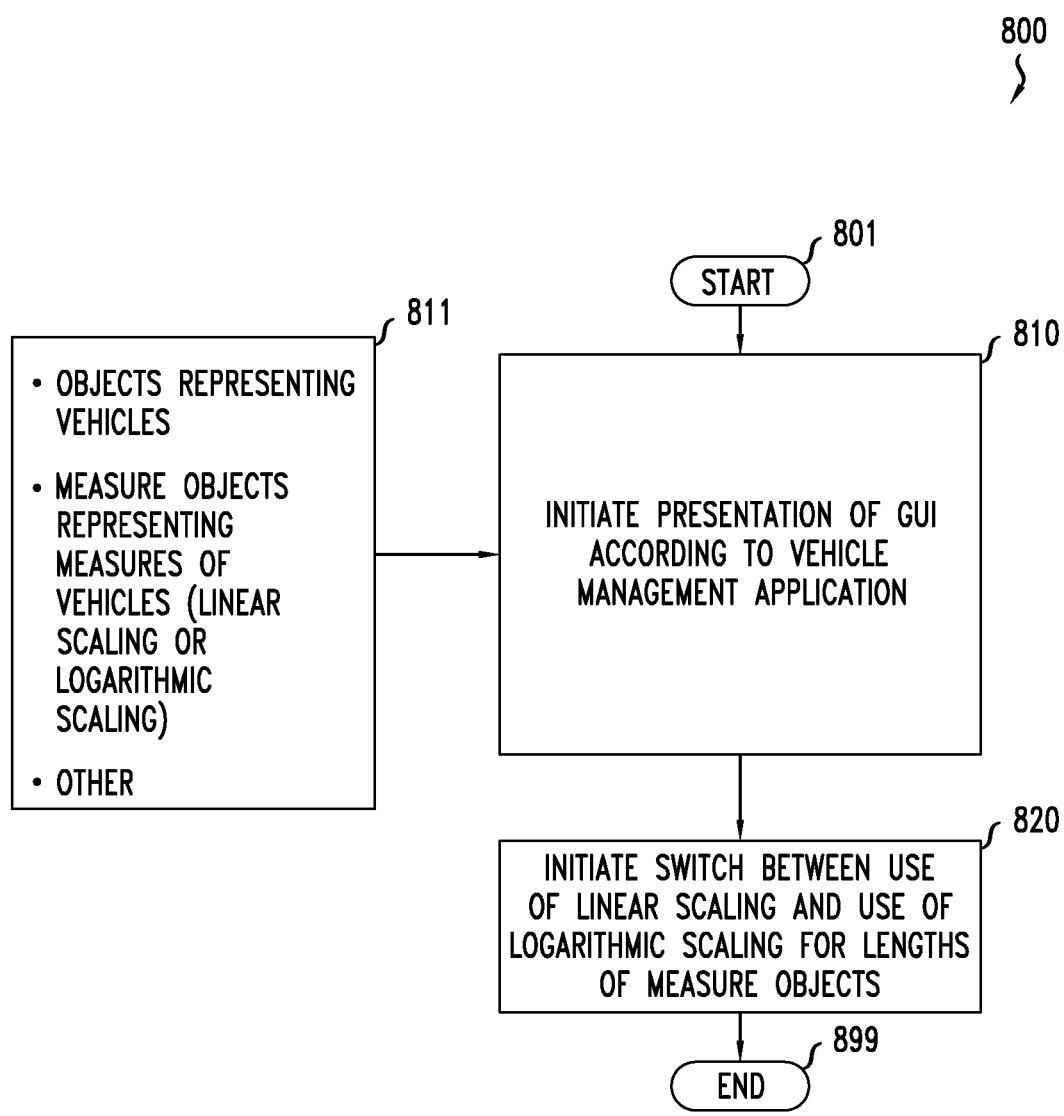
FIG. 8 depicts an embodiment of a method for supporting marking of vehicle measures of vehicles using measure objects that are based on the measures of the vehicles.

FIG. 8 depicts an embodiment of a method for supporting marking of vehicle measures of vehicles using measure objects that are based on the measures of the vehicles. The method 800 of FIG. 8 may be executed by a device, which may be an end user device or a vehicle management controller. It will be appreciated that, although primarily presented as being performed serially, at least a portion of the functions may be performed contemporaneously or in a different order than as presented in FIG. 8. At block 801, method 800 begins. At block 810, presentation of the GUI according to a vehicle management application is initiated at the device. As indicated by block 811, the GUI includes one or more vehicle objects representing one or more respective vehicles. As indicated by block 811, the GUI includes one or more measure objects representing respective measures of the one or more vehicles, where respective lengths of the one or more measure objects have a linear scaling in which the respective lengths of the measure objects are linearly related to the respective measures of the one or more vehicles or a logarithmic scaling in which the respective lengths of the measure objects are logarithmically related to the respective measures of the one or more vehicles. As indicated by block 811, the GUI may include other objects and information. At block 820, a switch between use of the linear scaling and use of the logarithmic scaling for the respective lengths of the one or more measure objects is initiated at the device. At block 899, method 800 ends.

Various embodiments of the vehicle marking capability may provide various advantages or potential advantages. For example, various embodiments of the vehicle marking capability may enable improved presentation of vehicle measure information. For example, various embodiments of the vehicle marking capability may overcome problems typically associated with visualization of vehicle altitude from a traditional 2D map view. For example, various embodiments of the vehicle marking capability may overcome problems typically associated with visualization pf vertical speed of an aerial vehicle when the aerial vehicle is ascending or descending. For example, various embodiments of the vehicle marking capability may enable presentation of vehicle measure information using measure objects while ensuring that the measure objects do not grow inconveniently tall to obstruct other map elements or to partially disappear from view. For example, various embodiments of the vehicle marking capability may enable presentation of vehicle altitude information using altitude columns having heights logarithmically related to vehicle altitudes, thereby supporting highlighting of low altitudes (typically the most important to observe, as these are the altitudes during takeoff and landing) while also supporting abstracting of higher altitudes without obstructing other map elements or partially disappearing from view. For example, various embodiments of the vehicle marking capability may provide significant improvements in user friendliness for users of vehicle tracking systems, providing easier access to information by users via improved GUI controls, improved visualization of information by users via improved GUI objects, improved control over vehicles, or the like, as well as various combinations thereof. Various embodiments of the vehicle marking capability may provide various other advantages or potential advantages.

Figure 9:
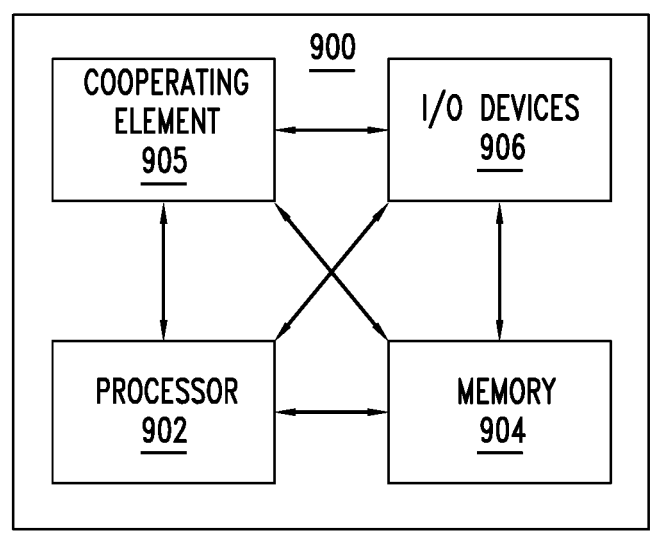
FIG. 9 depicts a high-level block diagram of a computer suitable for use in performing various functions presented herein.

FIG. 9 depicts a high-level block diagram of a computer suitable for use in performing various functions described herein.

The computer 900 includes a processor 902 (e.g., a central processing unit (CPU), a processor having a set of one or more processor cores, or the like) and a memory 904 (e.g., a random access memory (RAM), a read only memory (ROM), or the like). The processor 902 and the memory 904 are communicatively connected.

The computer 900 also may include a cooperating element 905. The cooperating element 905 may be a hardware device. The cooperating element 905 may be a process that can be loaded into the memory 904 and executed by the processor 902 to implement functions as discussed herein (in which case, for example, the cooperating element 905 (including associated data structures) can be stored on a non-transitory computer-readable storage medium, such as a storage device or other storage element (e.g., a magnetic drive, an optical drive, or the like)).

The computer 900 also may include one or more input/output devices 906. The input/output devices 906 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices or elements (e.g., a tape drive, a floppy drive, a hard disk drive, a compact disk drive, or the like), or the like, as well as various combinations thereof.

It will be appreciated that computer 900 of FIG. 9 may represent a general architecture and functionality suitable for implementing functional elements described herein, portions of functional elements described herein, or the like, as well as various combinations thereof. For example, computer 900 may provide a general architecture and functionality that is suitable for implementing one or more of a UAV 102, a vehicle management system 110, or the like. For example, computer 900 may provide a general architecture and functionality that is suitable for implementing various apparatuses described herein.

It will be appreciated that an apparatus configured to provide various embodiments of vehicle marking capability may be any suitable electronics device. For example, in at least some exemplary embodiments, the apparatus may be a mobile device, a user equipment, a tablet computer, a computer, a video playback apparatus, or the like.

The apparatus may include a processor and a memory or any suitable storage means. The processor of the apparatus may be coupled to the memory or the suitable storage means. The memory or the suitable storage means may include a program code section for storing program codes implementable upon the processor. The memory or the suitable storage means may further include a stored data section for storing data, for example, data that has been processed or that is to be processed in accordance with various embodiments described herein. Such stored data may be the above-mentioned vehicle status information (e.g., location, altitude, or the like). The implemented program code stored within the program code section and the data stored within the stored data section may be retrieved by the processor whenever needed via a processor-memory coupling.

The apparatus may include a user interface. The user interface may be coupled to the processor. The processor may control the operation of the user interface and receive inputs from the user interface. The user interface may enable a user to input commands to the apparatus, for example, via a keypad, mouse, touchpad, button, trackball, or the like. The user interface may enable the user to obtain information from the apparatus. For example, the user interface may include a screen or a display or a display device, configured to display information (e.g., altitude information, a path on a navigational map, or the like, as described herein) from the apparatus to the user. The user interface may include a touch screen or a touch interface capable of both enabling information to be entered to the apparatus and further capable of displaying information to the user of the apparatus. In an exemplary embodiment, the user interface may be the user interface for communicating with an autonomous vehicle as above-mentioned.

The apparatus may include a transceiver. The transceiver, in such an embodiment, may be coupled to the processor and configured to enable communication with other apparatuses or electronic devices, for example, via a wireless communications network. The transceiver or any suitable transceiver or transmitter and/or receiver means may be configured to communicate with other apparatuses or electronic devices via a wire or wired coupling. The transceiver may communicate with a further apparatus or electronic device by any suitable known communications protocol (e.g., the transceiver or transceiver means may use a suitable UMTS protocol, a suitable LTE protocol, a suitable WLAN protocol (e.g., IEEE 802.X), a suitable short-range radio frequency communication protocol (e.g., Bluetooth), a suitable IRDA, or the like, as well as various combinations thereof.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of functions or elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory storing a set of instructions;
   wherein the set of instructions is configured to, when executed by the at least one processor, cause the apparatus to:
      initiate presentation of a graphical user interface (GUI) at a device according to a vehicle management application, wherein the GUI includes:
         a first GUI portion, wherein the first GUI portion includes a map, one or more vehicle objects representing one or more respective vehicles, and flight path information for at least one of the one or more vehicles; and
         a second GUI portion separate from the first GUI portion, wherein the second GUI portion includes one or more altitude objects representing respective altitudes of the one or more vehicles, wherein respective lengths of the one or more altitude objects have a scaling in which the respective lengths of the one or more altitude objects are related to the respective altitudes of the one or more vehicles;
      select, based on a determination that an altitude parameter associated with the one or more vehicles fails to satisfy a threshold, the scaling to be a linear scaling in which the respective lengths of the one or more altitude objects are linearly related to the respective altitudes of the one or more vehicles; and
      control, based on a determination that the altitude parameter associated with the one or more vehicles satisfies the threshold, switching of the scaling from the linear scaling to a logarithmic scaling in which the respective lengths of the one or more altitude objects are logarithmically related to the respective altitudes of the one or more vehicles.

2. The apparatus of claim 1, the first GUI portion and the second GUI portion are non-overlapping.

3. The apparatus of claim 1, wherein the map comprises a map, in perspective view, of a region within which the one or more vehicles are operating.

4. The apparatus of claim 1, wherein the altitude parameter comprises a highest vehicle altitude parameter or an average vehicle altitude parameter.

5. The apparatus of claim 1, wherein the scaling is selected to be the linear scaling based on a determination that the one or more vehicles are in a takeoff phase.

6. The apparatus of claim 1, wherein the set of instructions is configured to, when executed by the at least one processor, cause the apparatus to:
   control, based on a determination that the altitude parameter associated with the one or more vehicles no longer satisfies the threshold, switching of the scaling from the logarithmic scaling to the linear scaling.

7. The apparatus of claim 6, wherein the scaling is switched from the logarithmic scaling to the linear scaling based on a determination that the one or more vehicles are in a landing phase.

8. The apparatus of claim 1, wherein the set of instructions is configured to, when executed by the at least one processor, cause the apparatus to:
   determine a level of detail to provide in the GUI for the one or more vehicles.

9. The apparatus of claim 8, wherein the level of detail to provide in the GUI for the one or more vehicles is determined based on at least one of a quantity of vehicles represented in the GUI, respective locations of the one or more vehicles, or an indication as to whether there is overlap of information presented in the GUI for the one or more vehicles.

10. The apparatus of claim 1, wherein the set of instructions is configured to, when executed by the at least one processor, cause the apparatus to:
    initiate switching from use of a first level of detail in the GUI for the one or more vehicles to use of a second level of detail in the GUI for the one or more vehicles based on at least one of a detection of overlap of information presented in the GUI for the one or more vehicles or a detection of a request for a different level of detail in the GUI.

11. The apparatus of claim 1, wherein the apparatus is or forms part of the device, wherein, to initiate presentation of the GUI on the device, the set of instructions is configured to, when executed by the at least one processor, cause the apparatus to provide imagery including the GUI to a display interface of the device.

12. The apparatus of claim 1, wherein the apparatus is or forms part of a vehicle management controller, wherein, to initiate presentation of the GUI on the device, the set of instructions is configured to, when executed by the at least one processor, cause the apparatus to send imagery including the GUI toward the device via a communication network.

13. The apparatus of claim 1, wherein the altitude objects are presented on a graph having a first axis marked with altitude values indicative of lengths of the altitude objects and having a second axis configured to provide additional information for at least one of the one or more vehicles.

14. The apparatus of claim 13, wherein the second axis is a time axis or a location axis.

15. The apparatus of claim 1, wherein the GUI further includes at least one of battery status information for at least one of the one or more vehicles or velocity information for at least one of the one or more vehicles.

16. The apparatus of claim 1, wherein the set of instructions is configured to, when executed by the at least one processor, cause the apparatus to:
    present, in the second GUI portion, historical altitude information for at least one of the one or more vehicle objects.

17. A non-transitory computer-readable storage medium storing instructions which, when executed by a processor of an apparatus, cause the apparatus to perform a method, the method comprising:

initiating presentation of a graphical user interface (GUI) at a device according to a vehicle management application, wherein the GUI includes:
- a first GUI portion, wherein the first GUI portion includes a map, one or more vehicle objects representing one or more respective vehicles, and flight path information for at least one of the one or more vehicles; and
- a second GUI portion separate from the first GUI portion, wherein the second GUI portion includes one or more altitude objects representing respective altitudes of the one or more vehicles, wherein respective lengths of the one or more altitude objects have a scaling in which the respective lengths of the one or more altitude objects are related to the respective altitudes of the one or more vehicles;

selecting, based on a determination that an altitude parameter associated with the one or more vehicles fails to satisfy a threshold, the scaling to be a linear scaling in which the respective lengths of the one or more altitude objects are linearly related to the respective altitudes of the one or more vehicles; and controlling, based on a determination that the altitude parameter associated with the one or more vehicles satisfies the threshold, switching of the scaling from the linear scaling to a logarithmic scaling in which the respective lengths of the one or more altitude objects are logarithmically related to the respective altitudes of the one or more vehicles.

18. A method, comprising:

initiating, by a processor, presentation of a graphical user interface (GUI) at a device according to a vehicle management application, wherein the GUI includes:
- a first GUI portion, wherein the first GUI portion includes a map, one or more vehicle objects representing one or more respective vehicles, and flight path information for at least one of the one or more vehicles; and
- a second GUI portion separate from the first GUI portion, wherein the second GUI portion includes one or more altitude objects representing respective altitudes of the one or more vehicles, wherein respective lengths of the one or more altitude objects have a scaling in which the respective lengths of the one or more altitude objects are related to the respective altitudes of the one or more vehicles;

selecting, by the processor based on a determination that an altitude parameter associated with the one or more vehicles fails to satisfy a threshold, the scaling to be a linear scaling in which the respective lengths of the one or more altitude objects are linearly related to the respective altitudes of the one or more vehicles; and controlling, by the processor based on a determination that the altitude parameter associated with the one or more vehicles satisfies the threshold, switching of the scaling from the linear scaling to a logarithmic scaling in which the respective lengths of the one or more altitude objects are logarithmically related to the respective altitudes of the one or more vehicles.

\* \* \* \* \*